United States Patent
Joung et al.

(10) Patent No.: US 12,544,694 B2
(45) Date of Patent: Feb. 10, 2026

(54) FILTER ASSEMBLY AND REFRIGERATOR INCLUDING THE SAME

(71) Applicant: MICROFILTER CO., LTD, Chungcheongbuk-do (KR)

(72) Inventors: Whi Dong Joung, Seoul (KR); Pil Kang Hwang, Chungcheongbuk-do (KR); Kyong Su Lee, Hwaseong-si (KR); Jin U Ju, Gumi-si (KR); Min Kyu Jung, Gumi-si (KR)

(73) Assignee: MICROFILTER CO., LTD, Chungcheongbuk-do (KR)

( * ) Notice: Subject to any disclaimer, the term of this patent is extended or adjusted under 35 U.S.C. 154(b) by 347 days.

(21) Appl. No.: 18/039,956

(22) PCT Filed: Nov. 26, 2021

(86) PCT No.: PCT/KR2021/017676
§ 371 (c)(1),
(2) Date: Jun. 1, 2023

(87) PCT Pub. No.: WO2022/119251
PCT Pub. Date: Jun. 9, 2022

(65) Prior Publication Data
US 2024/0024802 A1 Jan. 25, 2024

(30) Foreign Application Priority Data

Dec. 1, 2020 (KR) .......................... 10-2020-0165544
Dec. 1, 2020 (KR) .......................... 10-2020-0165545
(Continued)

(51) Int. Cl.
*B01D 35/027* (2006.01)
*B01D 35/157* (2006.01)
(Continued)

(52) U.S. Cl.
CPC ....... *B01D 35/027* (2013.01); *B01D 35/1573* (2013.01); *B01D 35/30* (2013.01);
(Continued)

(58) Field of Classification Search
CPC .............. C02F 2307/12; C02F 2307/10; F25D 2323/121; F25D 2323/122
See application file for complete search history.

(56) References Cited

U.S. PATENT DOCUMENTS

2012/0096888 A1* 4/2012 Park ...................... F25D 23/126
220/592.02
2018/0149416 A1 5/2018 Lee et al.
(Continued)

FOREIGN PATENT DOCUMENTS

CN 207002323 U 2/2018
CN 110023701 A 4/2022
(Continued)

OTHER PUBLICATIONS

International Search Report of PCT/KR2021/017676 mailed Mar. 3, 2022.

*Primary Examiner* — Benjamin M Kurtz
(74) *Attorney, Agent, or Firm* — Revolution IP, PLLC

(57) ABSTRACT

Proposed is a water purification filter assembly including a filter main body, an inlet port through which feed water is supplied from the outside and an outlet port through which the purified feed water is discharged being formed in the filter main body, a water purification tank arranged on one side of the filter main body, the feed water purified in the filter main body being stored in the water purification tank, a first casing, at least one side of the water purification tank being accommodated in the first casing obliquely at a predetermined angle with respect to the ground, and a second casing perpendicularly coupled to one end portion of
(Continued)

the first casing, the filter main body being accommodated in the second casing.

23 Claims, 23 Drawing Sheets

(30) Foreign Application Priority Data

Dec. 1, 2020 (KR) .......................... 10-2020-0165546
Dec. 1, 2020 (KR) .......................... 10-2020-0165547

(51) Int. Cl.
*B01D 35/30* (2006.01)
*C02F 1/00* (2023.01)
*F25D 17/02* (2006.01)

(52) U.S. Cl.
CPC .............. *C02F 1/003* (2013.01); *F25D 17/02* (2013.01); *B01D 2201/16* (2013.01); *B01D 2201/30* (2013.01); *B01D 2201/4023* (2013.01); *C02F 2201/005* (2013.01); *C02F 2307/12* (2013.01)

(56) References Cited

U.S. PATENT DOCUMENTS

2020/0191470 A1   6/2020   Park et al.
2021/0147253 A1*  5/2021   Park .................... B01D 27/146

FOREIGN PATENT DOCUMENTS

| JP | 2016-104463 A | 6/2016 |
| KR | 10-1999-0012720 A | 2/1999 |
| KR | 10-0911682 B1 | 8/2009 |
| KR | 20-2011-0001021 | 1/2011 |
| KR | 10-2012-0041450 A | 5/2012 |
| KR | 10-2018-0062078 A | 6/2018 |
| KR | 10-2018-0089485 A | 8/2018 |
| KR | 10-2019-0108381 A | 9/2019 |
| KR | 10-2020-0074500 A | 6/2020 |
| WO | 2016-056594 A1 | 7/2017 |

* cited by examiner

[FIG. 1]
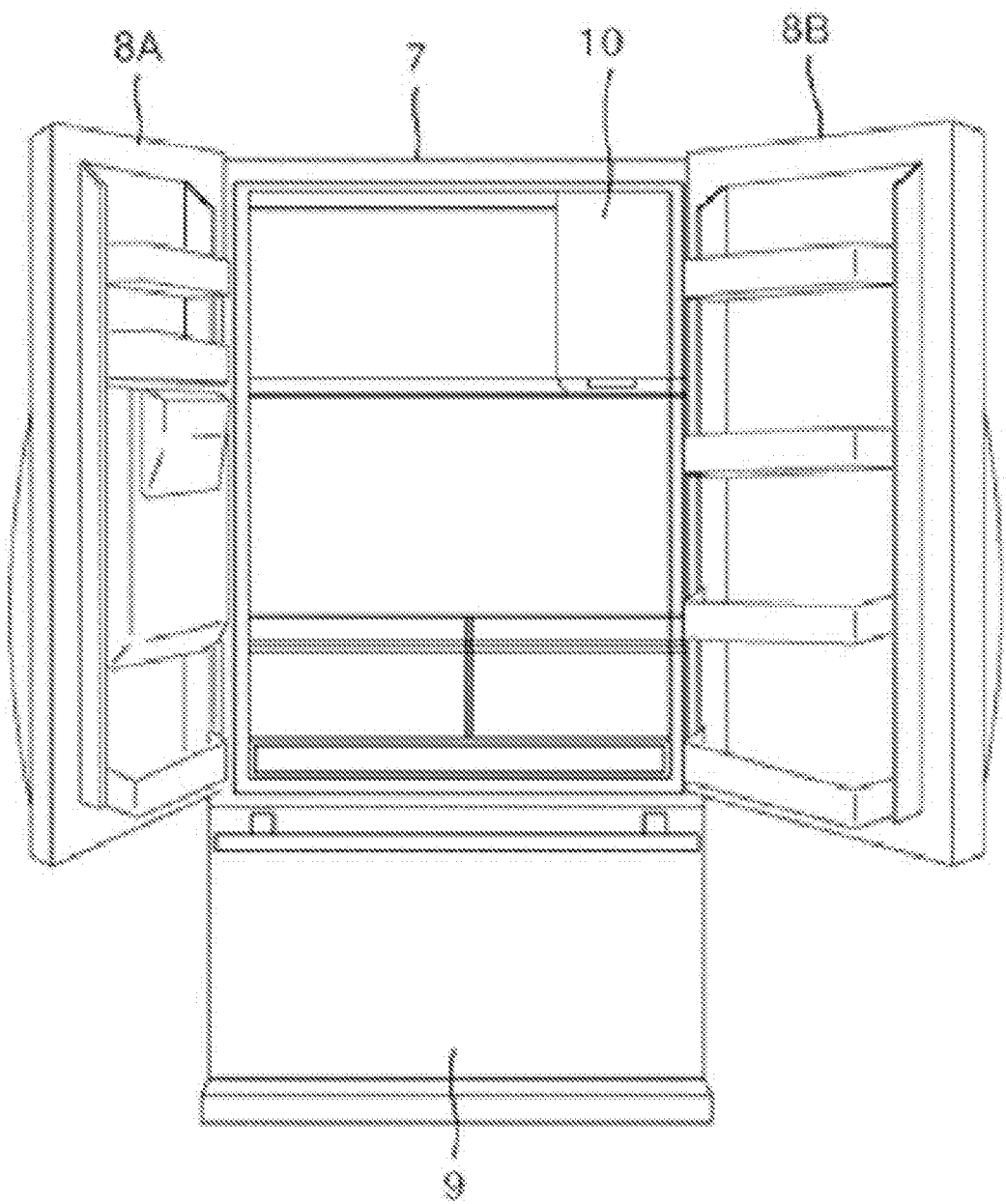

[FIG. 2]
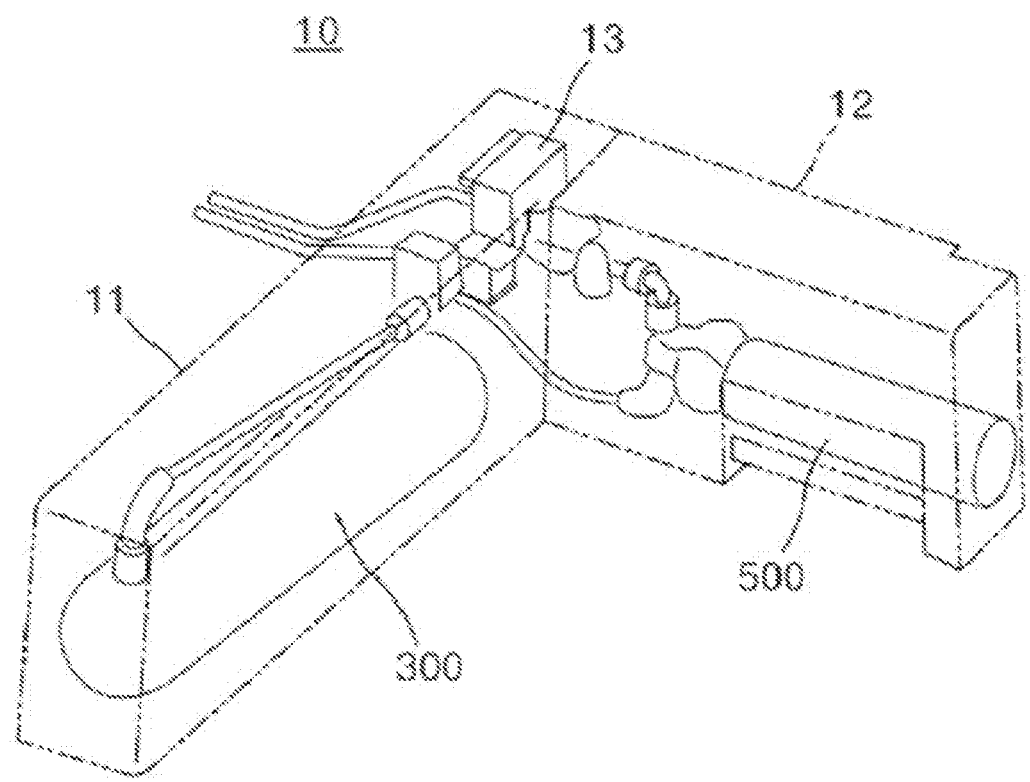
[FIG. 3]
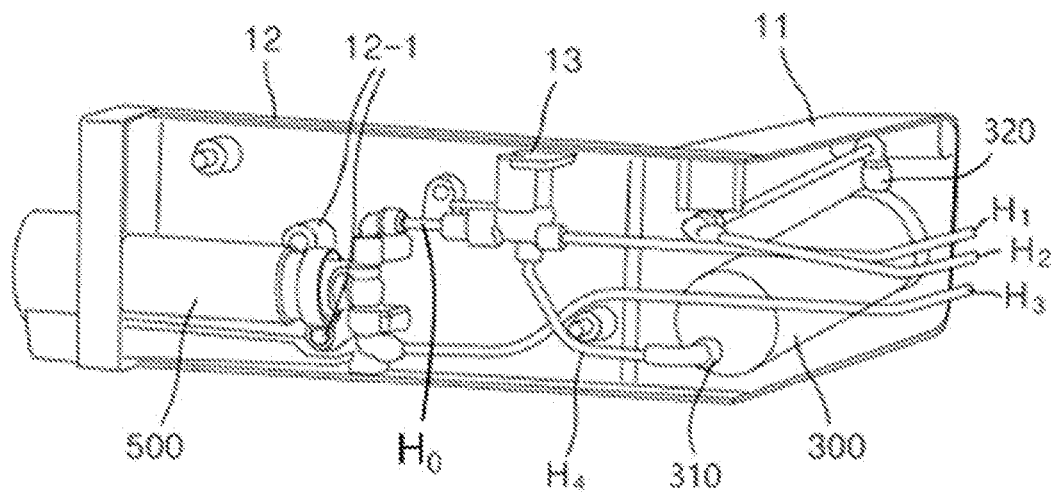

[FIG. 4]
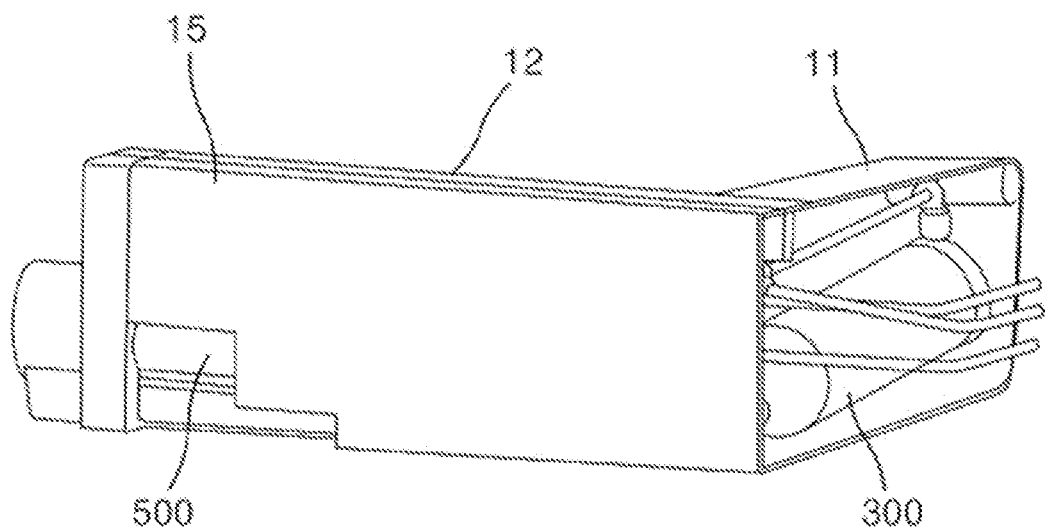

[FIG. 5]
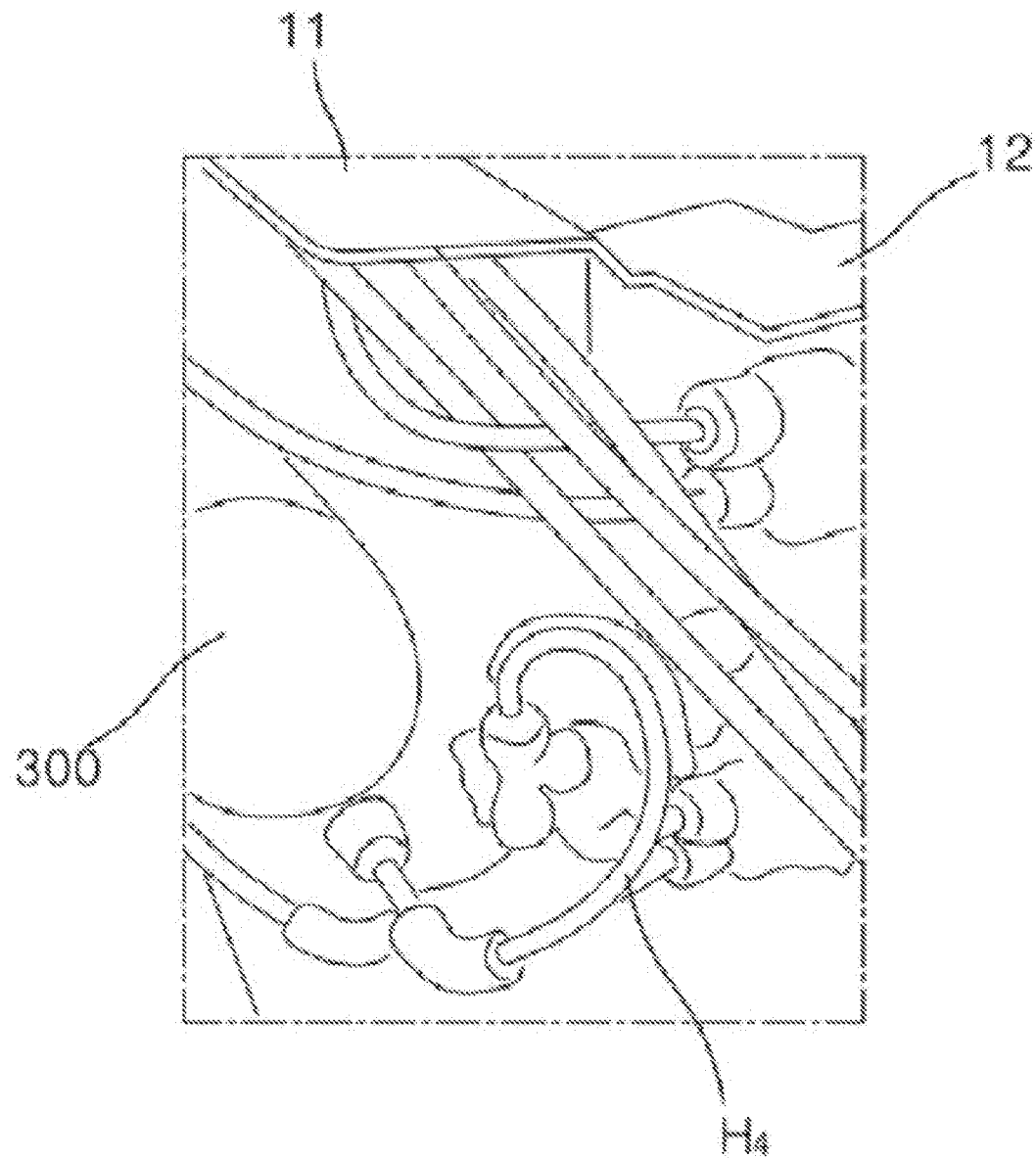

[FIG. 6]
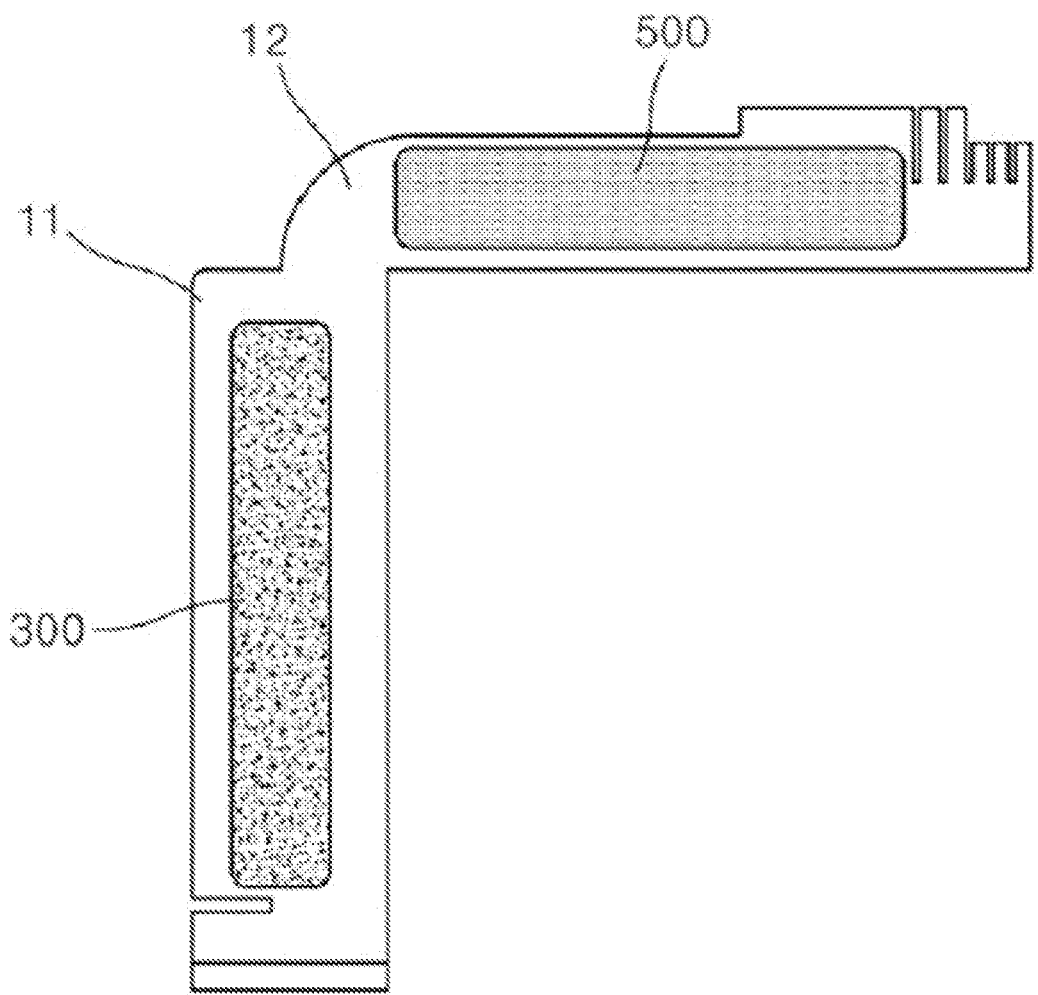

[FIG. 7]
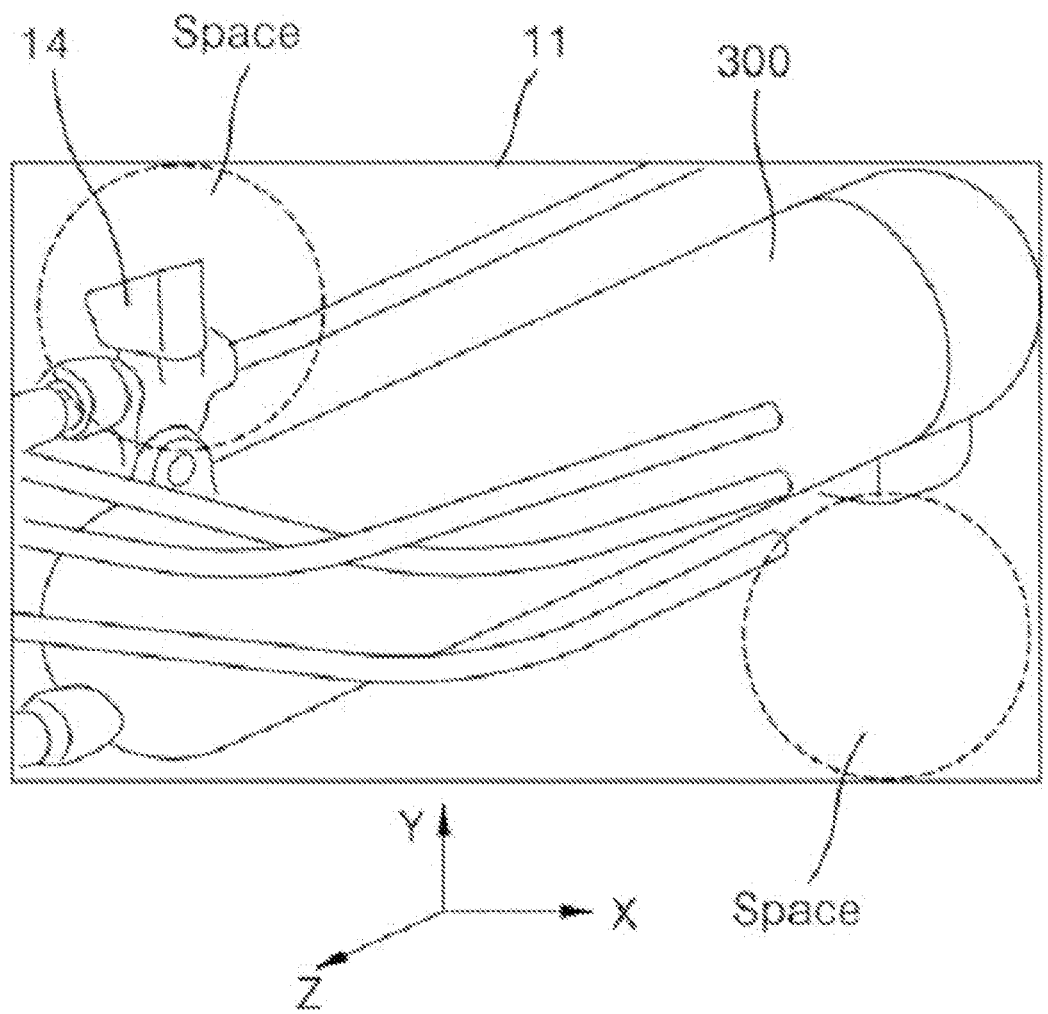

[FIG. 8]
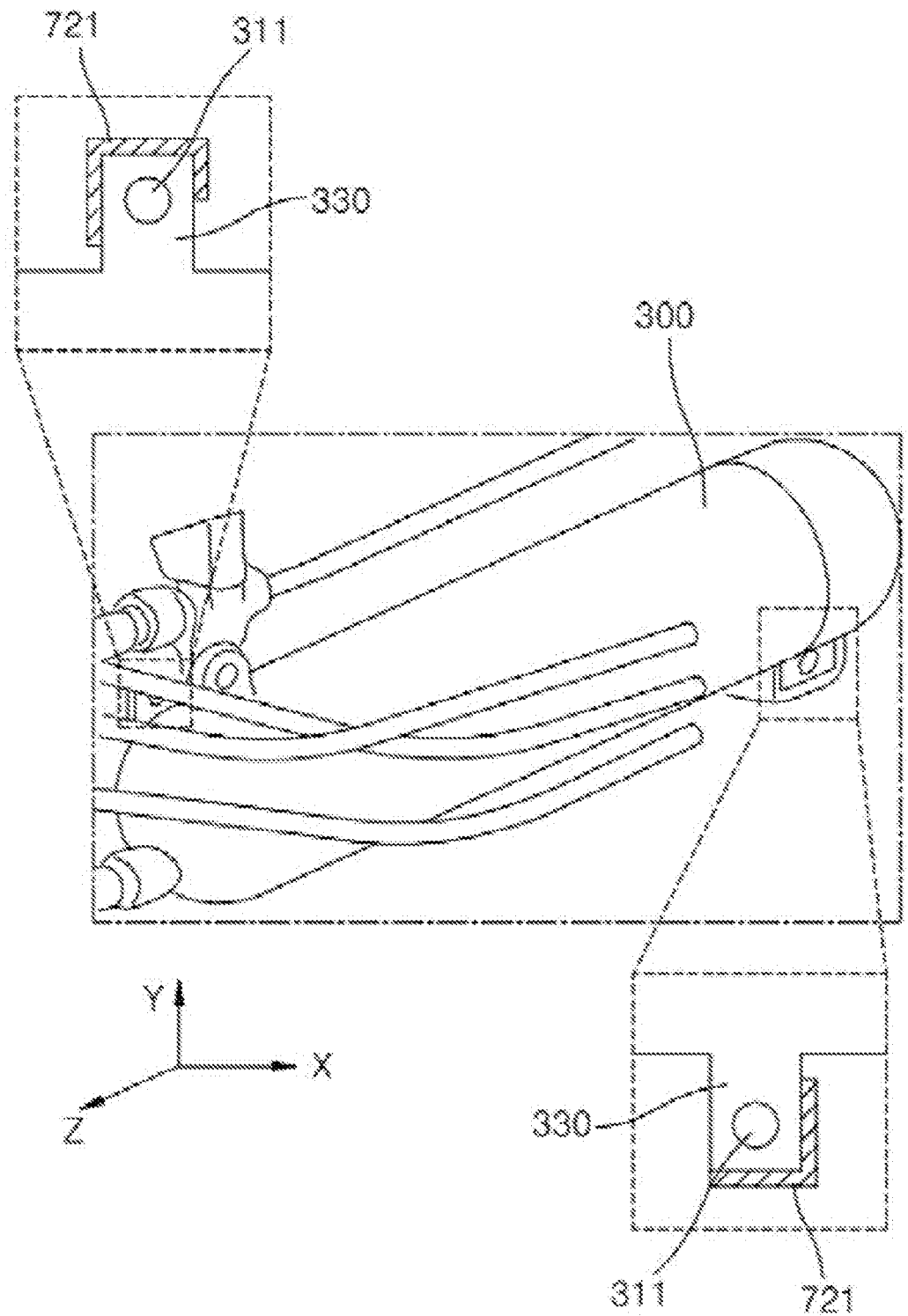

[FIG. 9]
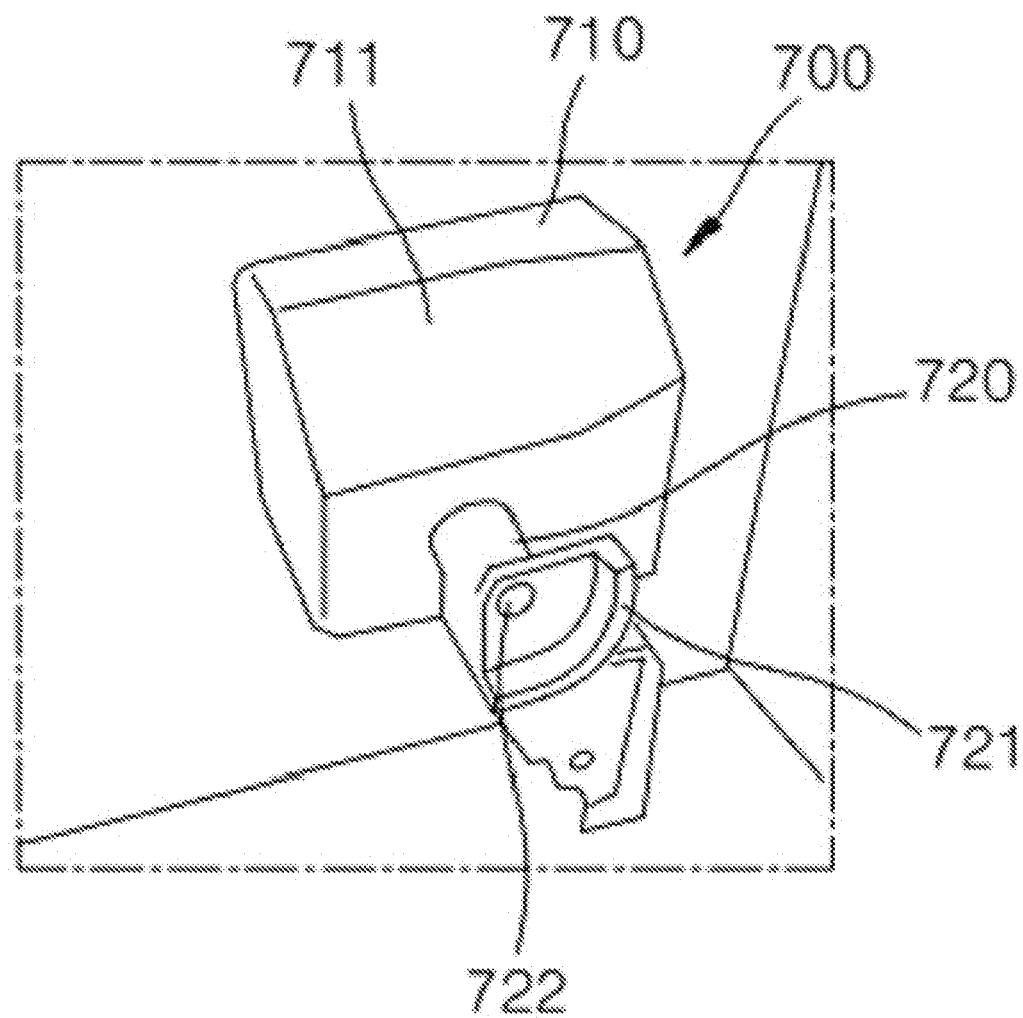

[FIG. 10]
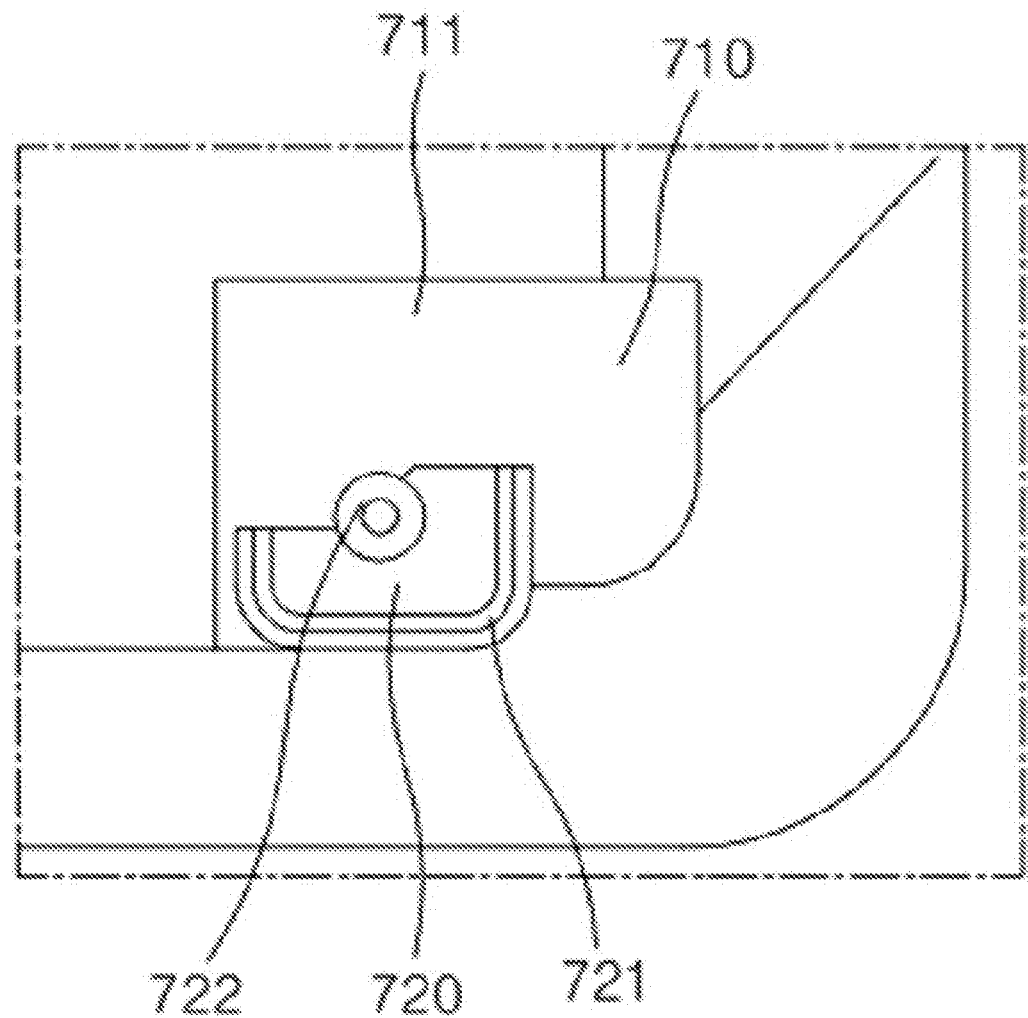

[FIG. 11]
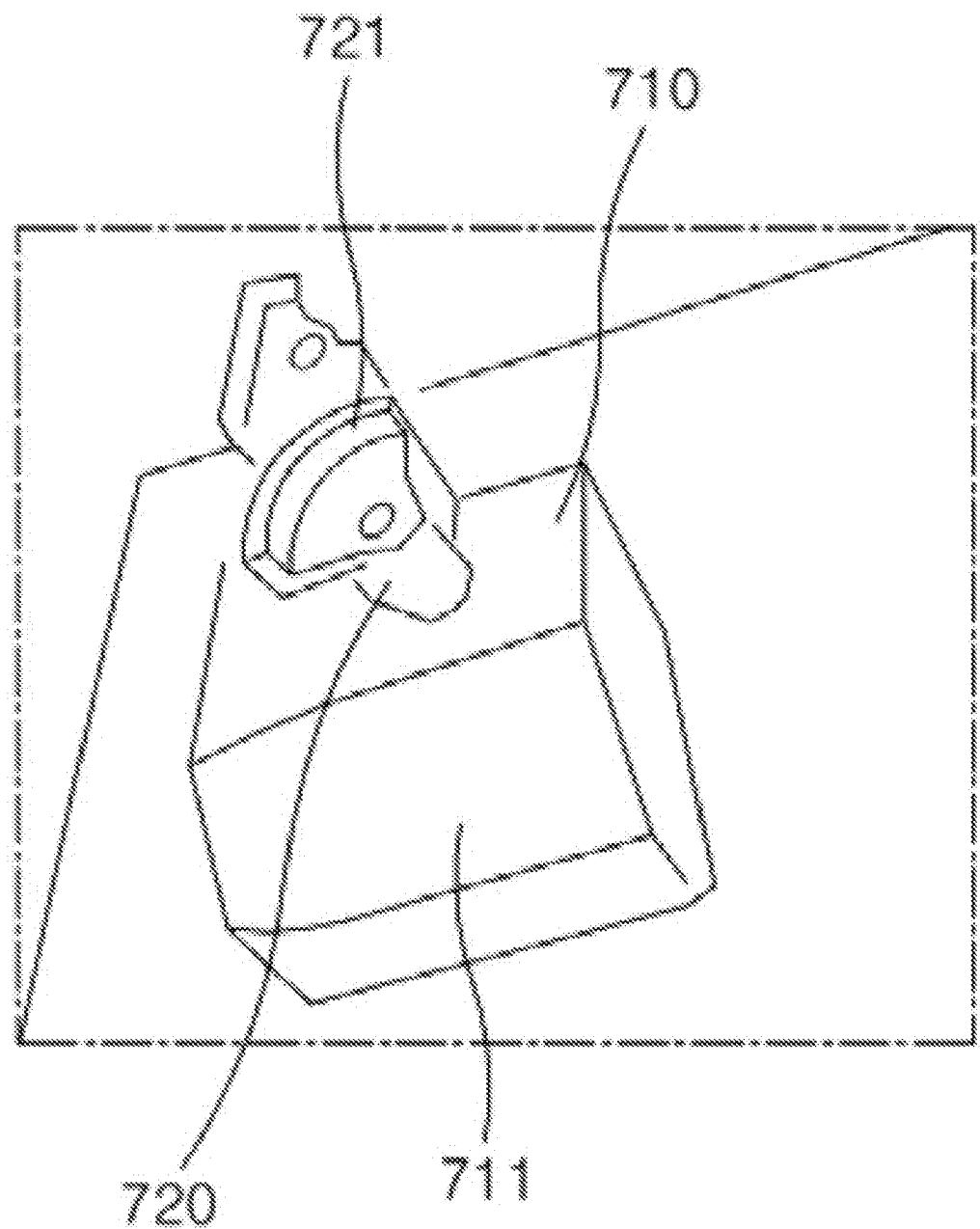

[FIG. 12]
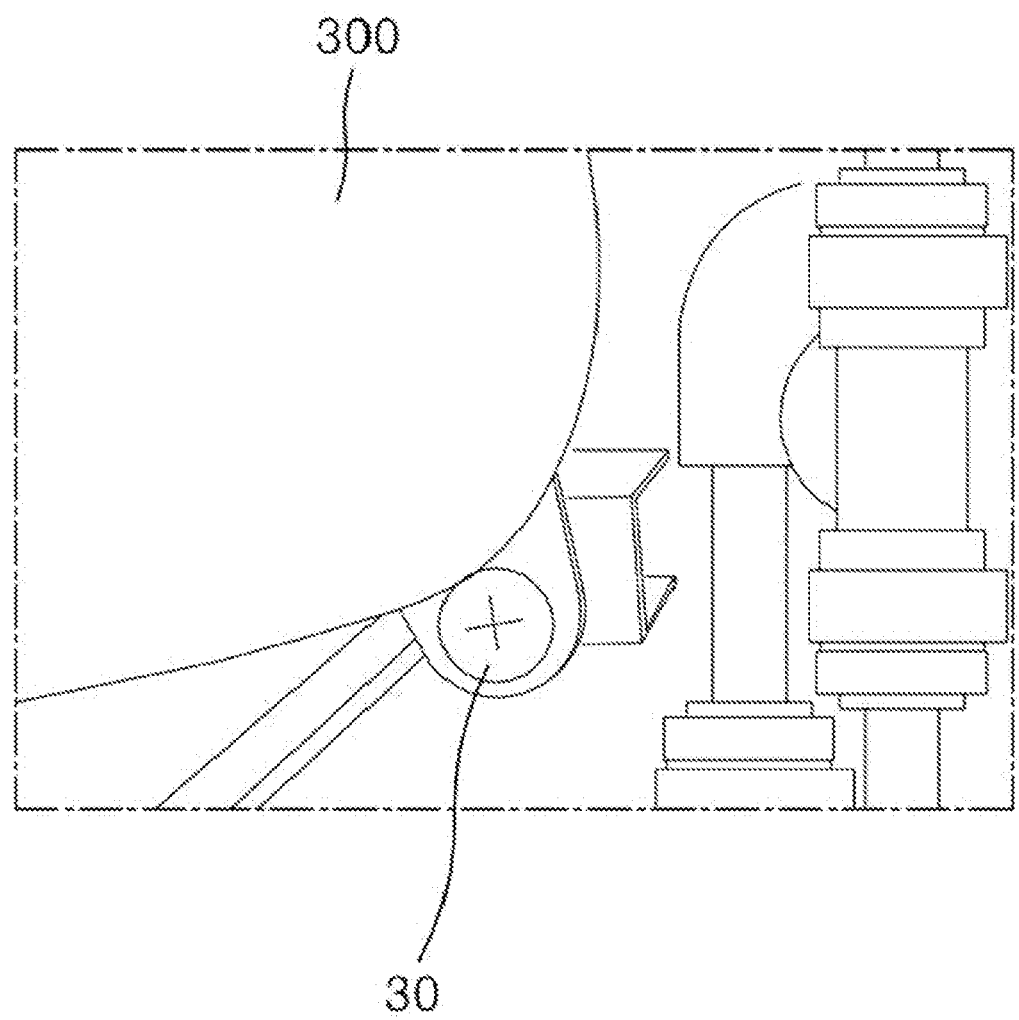

[FIG. 13]
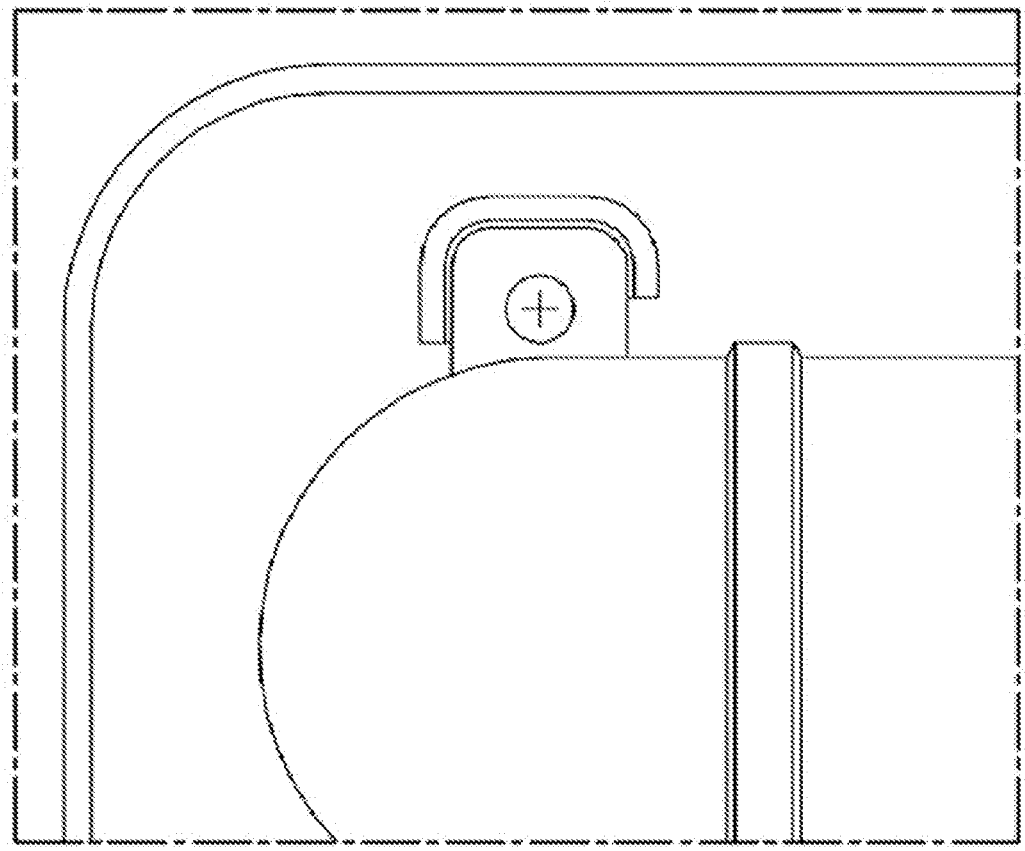

[FIG. 14]
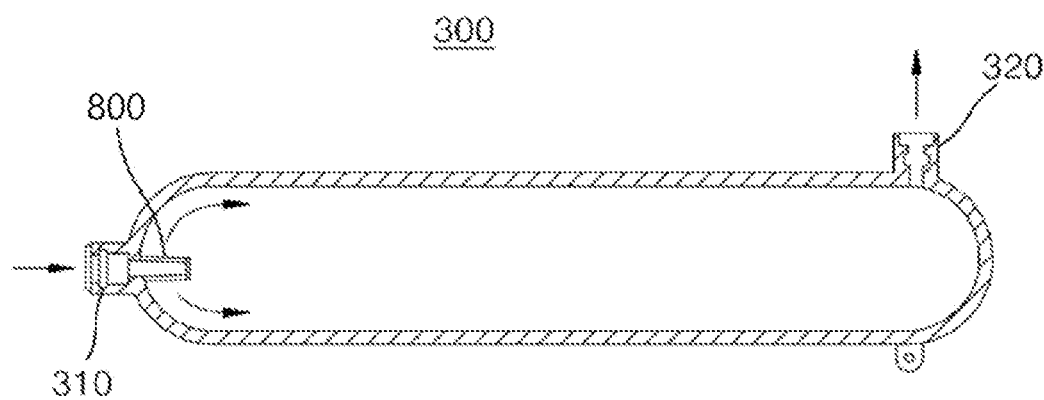

[FIG. 15]
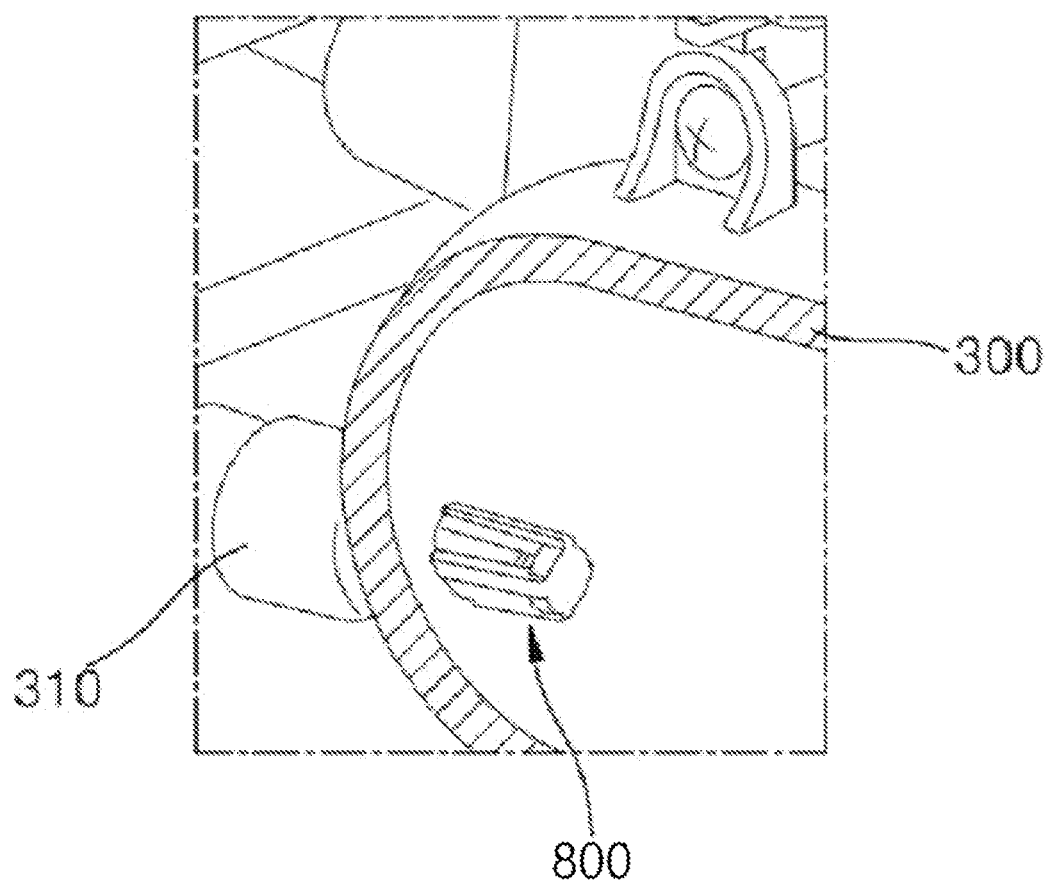

[FIG. 16]
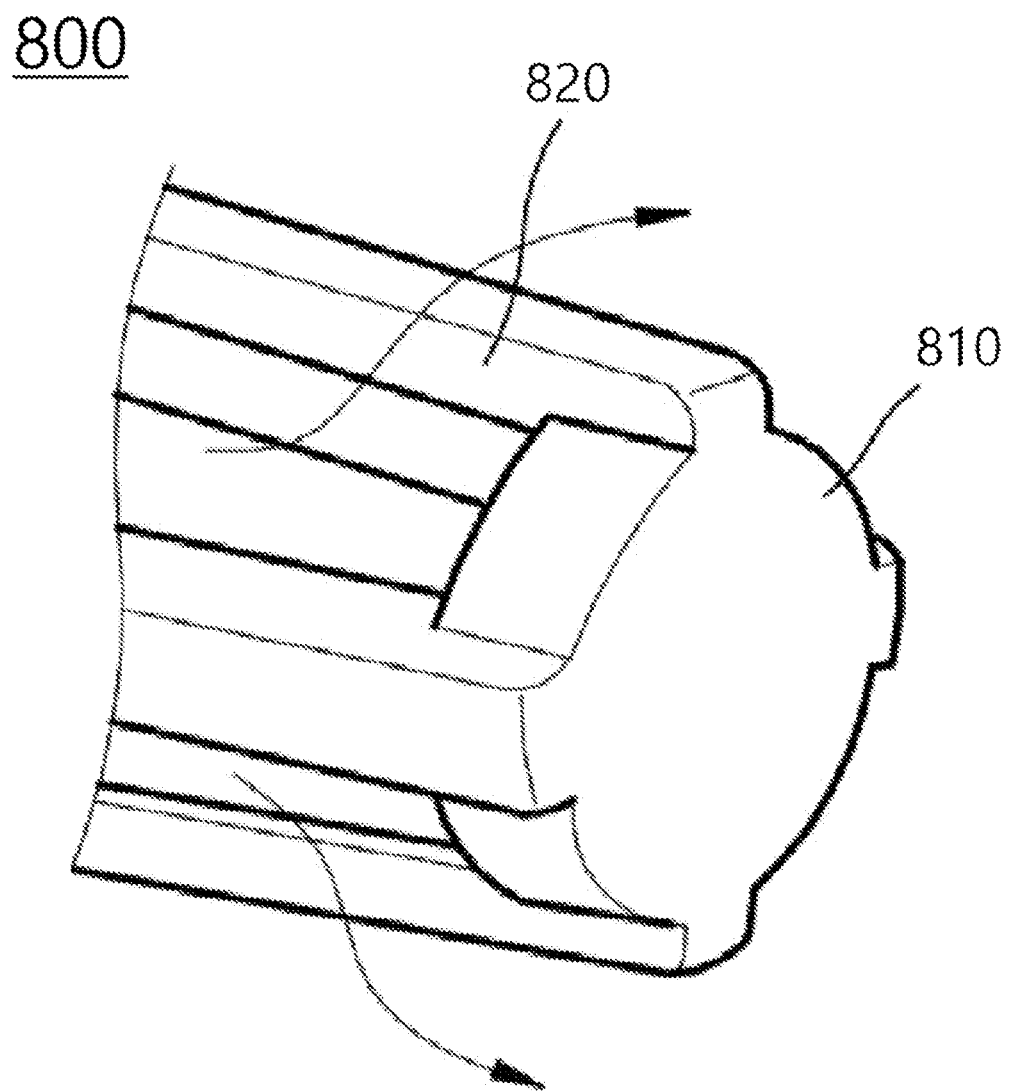

[FIG. 17]
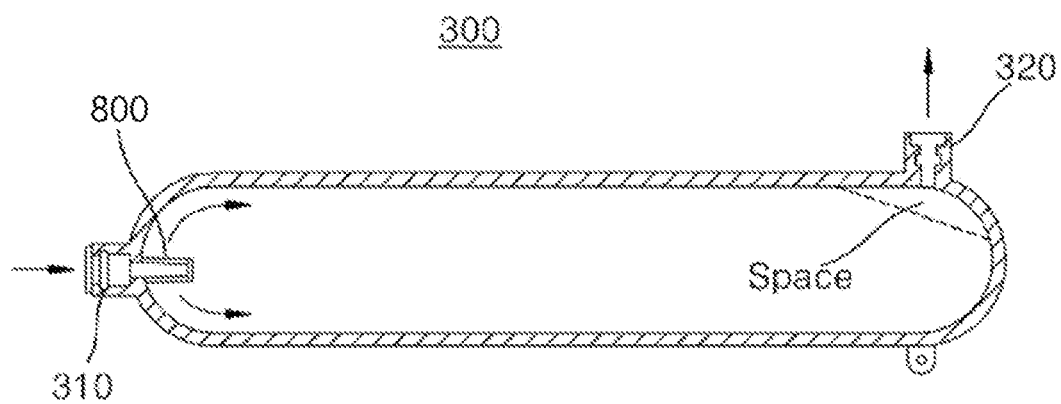

[FIG. 18]
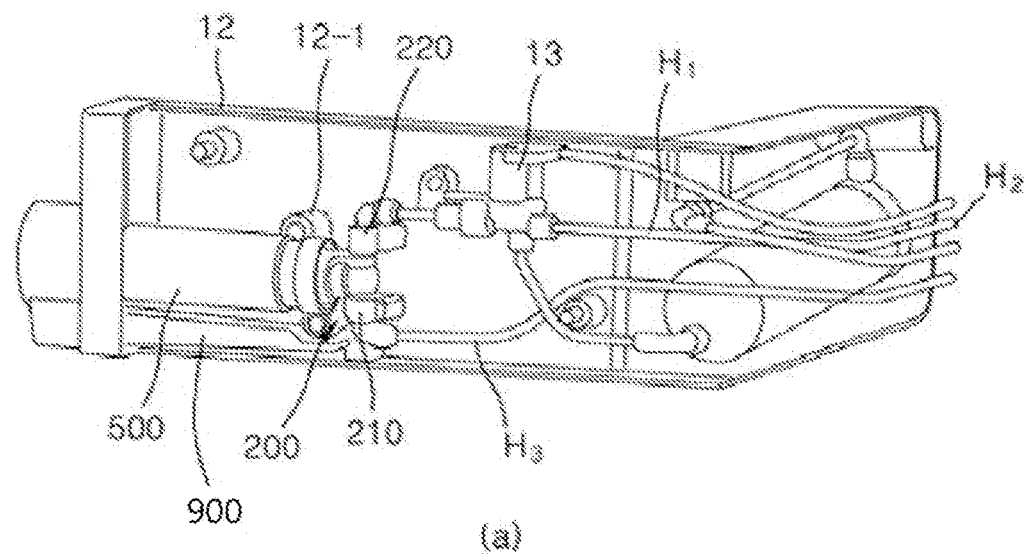
(a)
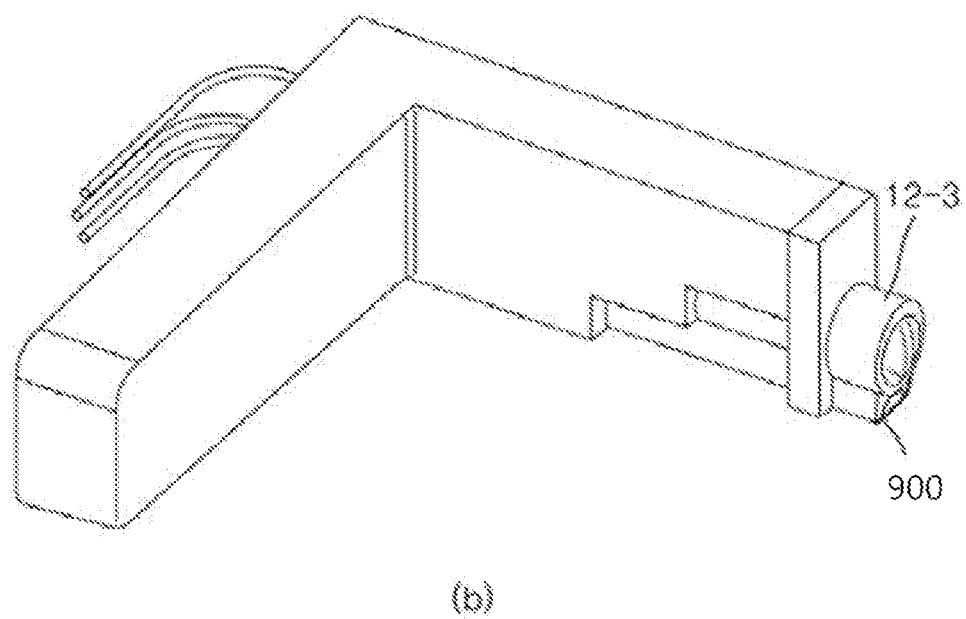
(b)

[FIG. 19]
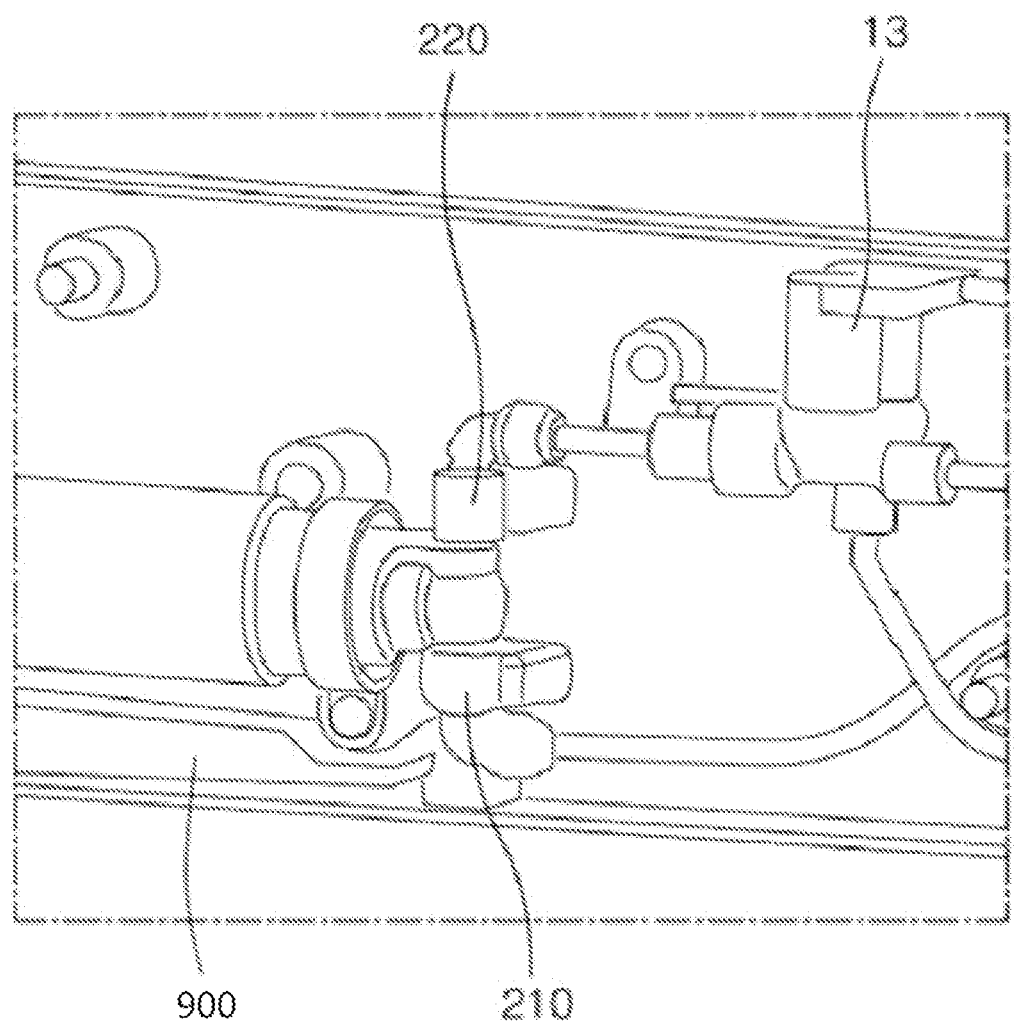

[FIG. 20]
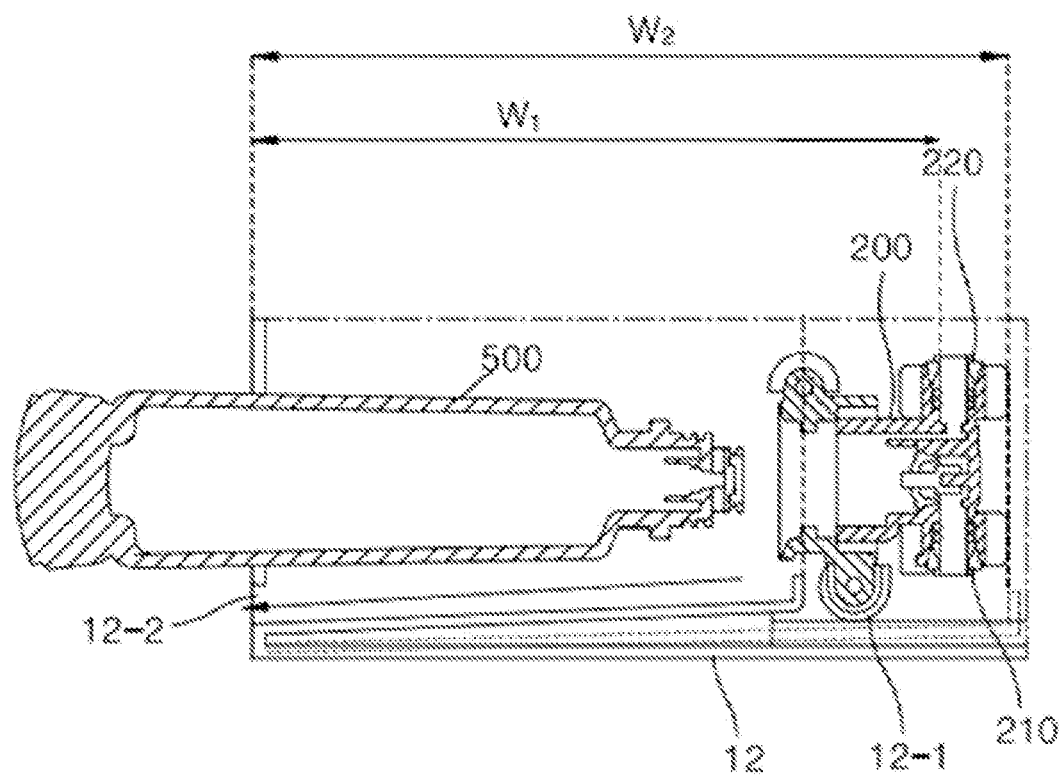

[FIG. 21]
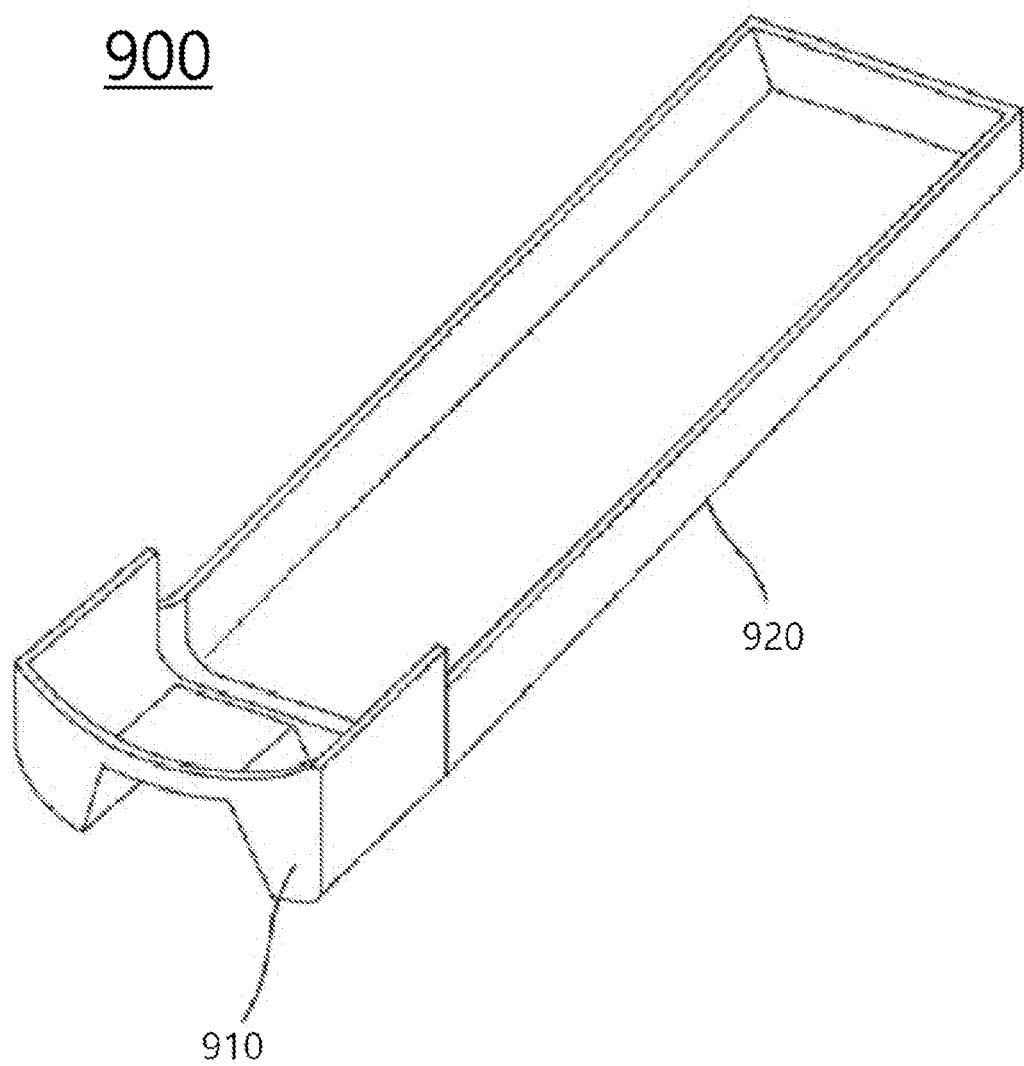

[FIG. 22]
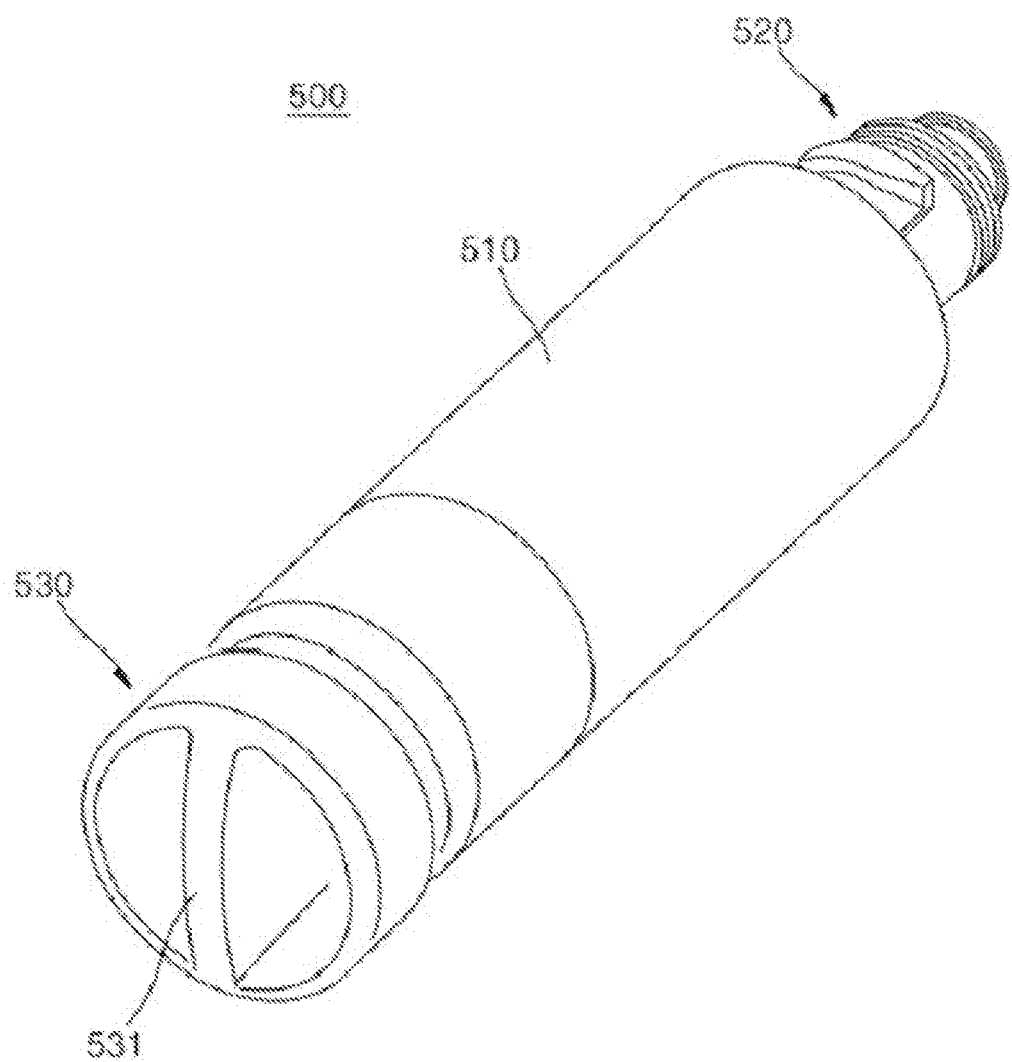

[FIG. 23]
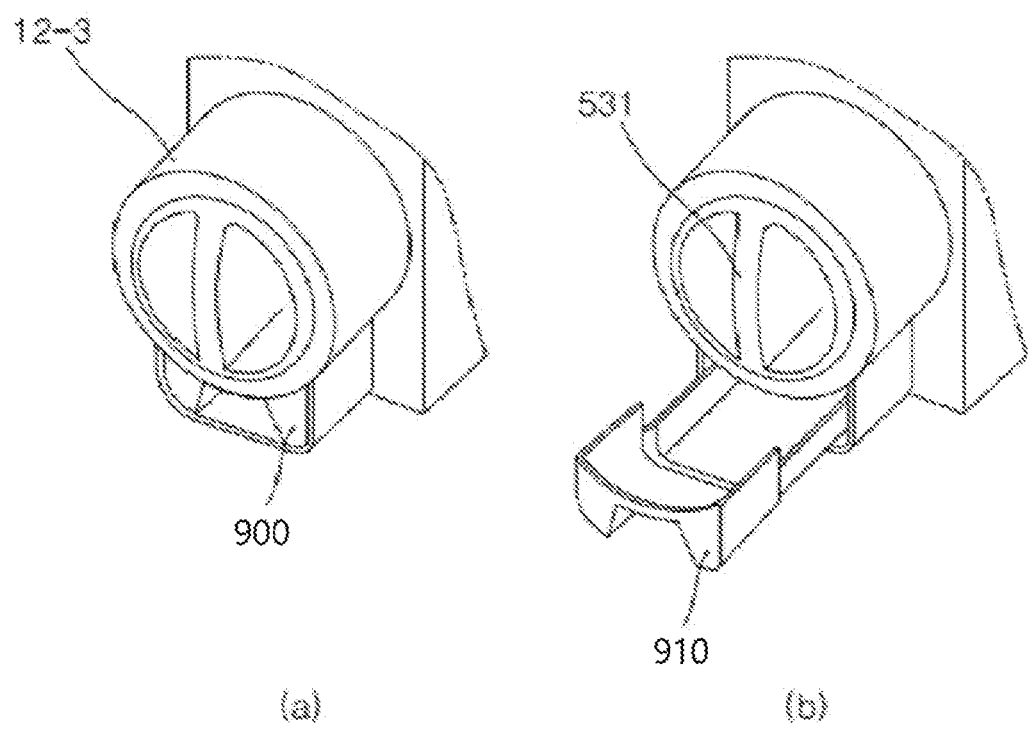

[FIG. 24]
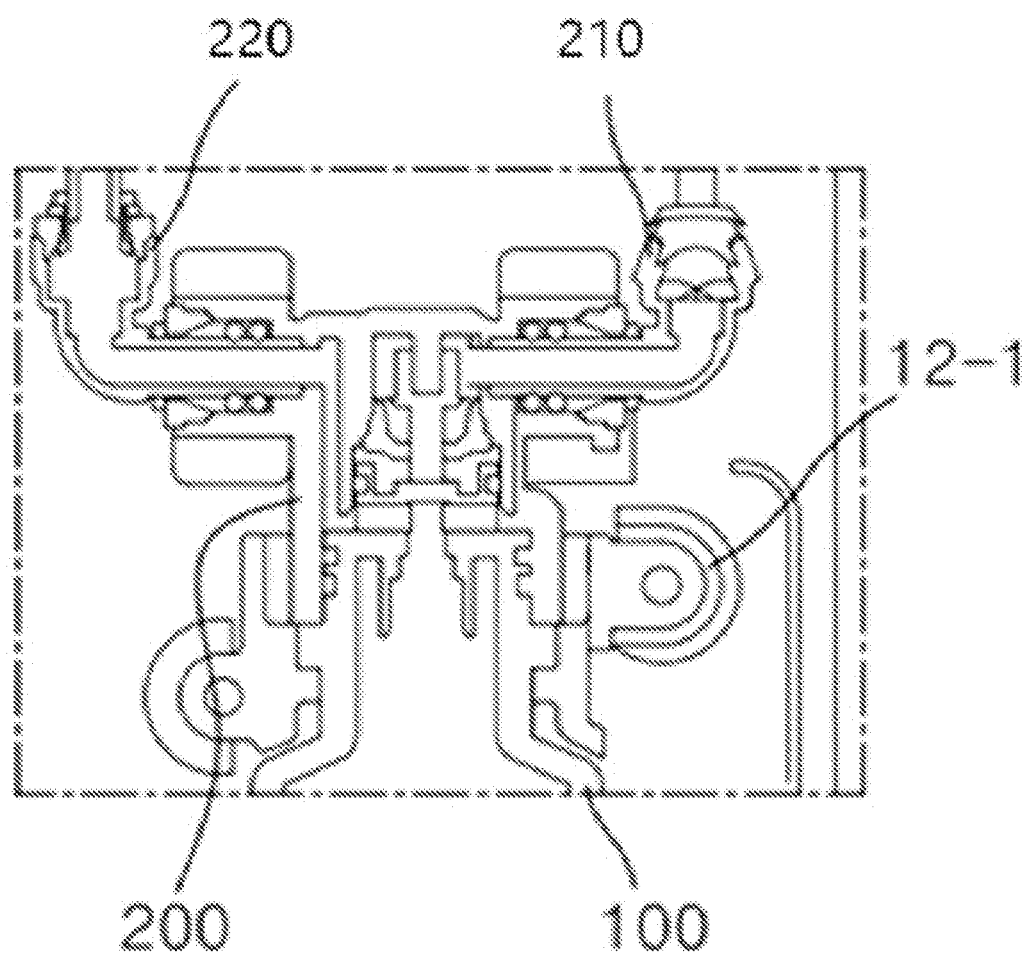

FILTER ASSEMBLY AND REFRIGERATOR INCLUDING THE SAME

CROSS REFERENCE TO PRIOR APPLICATIONS

This application is the 35 U.S.C. 371 national stage of International application PCT/KR2021/017676 filed on Nov. 26, 2021; which claims priority to Korean Patent Application Nos. 10-2020-0165544 filed on Dec. 1, 2020, 10-2020-0165545 filed on Dec. 1, 2020, 10-2020-0165546 filed on Dec. 1, 2020 and 10-2020-0165547 filed on Dec. 1, 2020. The entire contents of each of the above-identified applications are hereby incorporated by reference.

TECHNICAL FIELD

The present disclosure relates to a water purification filter assembly and a refrigerator including the water purification filter assembly and, more particularly, to a water purification filter assembly in which a filter that purifies water and a water tank in which the purified water is stored are installed in a casing, and a refrigerator including the water purification filter assembly.

BACKGROUND ART

Generally, a water purifier purifies tap water and supplies a user with the resulting high quality water, and includes at least one filter to remove microorganisms, minerals, or odors from the tap.

The filter gradually loses its functionality as it purifies the tap water, so it needs to be periodically replaced. Therefore, the water purifier is required to employ a structure that facilitates a user in replacing the filter.

"Assembly construction of water purifying filter for water purification system" is disclosed in Korean Public Utility Model Application Gazette No. 20-2011-0001021 (published on Jan. 31, 2011)

In the related art, an inflow port and an outflow port are protrusively formed on a cap fastened to a filter, and the inflow port and the outflow port are rotatably fastened to a pair of holders, respectively. As a result, the user can easily replace the filter by rotating the cap in order to rotate the inflow port and the outflow port about the pair of holders, respectively.

In recent years, refrigerators each having a function of a water purifier have been made available for sale on the market. The filter that performs the function of the water purifier has also been installed in these refrigerators.

Therefore, it is necessary to maximize space utilization by effectively arranging components, including the filter, within a limited space in household appliances, such as the water purifier or the refrigerator.

SUMMARY OF INVENTION

Technical Problem

An object of the present disclosure, which is contrived to solve the above-mentioned problem, is to provide a water purification filter assembly that employs an improved structure in which a water purification tank and a filter are included and is capable of being mounted within a limited space in a water purifier or a refrigerator and thus enabling efficient utilization of the limited space, and a refrigerator including the water purification filter assembly.

Another object of the present disclosure is to provide a water purification filter assembly that is specifically structured to arrange a water purification tank and a filter and thus is configured to stably support the water purification tank or the filter, and a refrigerator including the water purification filter assembly.

Still another object of the present disclosure is to provide a water purification filter assembly capable of sequentially inflowing and discharging feed water into and from a water purification tank in a circulating manner, and a refrigerator including the water purification filter assembly.

Still another object of the present disclosure is to provide a water purification filter assembly employing a structure that easily discharges water remaining in a filter when the filter is discharged while water is supplied and discharged within a water purifier or a refrigerator, and a refrigerator including the water purification filter assembly.

The present disclosure is not limited to the objects mentioned above. From the following detailed description, an object not mentioned above would be clearly understandable by a person of ordinary skill in the art.

Solution to Problem

In order to accomplish the above-mentioned objects, according to an aspect of the present disclosure, there is provided a water purification filter assembly including: a filter main body, an inlet port through which feed water is supplied from the outside and an outlet port through which the purified feed water is discharged being formed in the filter main body;
 a water purification tank arranged on one side of the filter main body, the feed water purified in the filter main body being stored in the water purification tank;
 a first casing, the water purification tank being accommodated in the first casing; and
 a second casing, the filter main body being accommodated in the second casing.

In the water purification filter assembly, the first casing in which the water purification tank is accommodated may be arranged adjacent to a rear surface of the second casing in which the filter main body is accommodated, the rear surface thereof being opposite to a front surface thereof.

The water purification filter assembly may employ a structure in which the second casing is perpendicularly coupled to one side of the first casing.

In the water purification filter assembly, the water purification tank that is accommodated in the first casing may be arranged in such a manner that at least one side thereof is inclined at a predetermined angle with respect to the ground.

In the water purification filter assembly, a valve may be arranged on an inclined portion of the water purification tank in the first casing.

In the water purification filter assembly, a valve may be arranged at least one of the first casing and the second casing.

In the water purification filter assembly, the valve may be formed on a connection portion of the filter main body and the water purification tank through which the feed water purified in the filter main body is discharged into the water purification tank and on a portion of the water purification tank through which the purified feed water is discharged to the outside.

In the water purification filter assembly, the purified feed water in the filter main body may be directly supplied to an ice maker for ice separation through the valve.

In the water purification filter assembly, the valve may be a DC valve or an AC valve.

In the water purification filter assembly, the first casing and the second casing may be coupled to each other in a manner that is rotatable at a predetermined angle.

In the water purification filter assembly, the first casing and the second casing may be detachably attached to each other.

The water purification filter assembly may further include at least one support supporting at least one side of the filter main body or the water purification tank,
wherein the support may include: an extensional contact body supporting at least one portion of the water purification tank or the filter main body; and a holding portion formed in a manner that extends from the extensional contact body in a shape that supports at least one portion of a fastening protrusion for the water purification tank or the filter main body.

In the water purification filter assembly, at least one of the support, the holding portion, and the fastening protrusion may be in a shape of a bar or rib that extends over a predetermined length.

In the water purification filter assembly, a fastening portion may be formed on each of the support and the fastening protrusion.

In the water purification filter assembly, the holding portion may be formed in a shape that supports at least one portion of the fastening protrusion.

In the water purification filter assembly, the holding portion may be formed in such a manner that at least one portion thereof has a curved or bent cross section.

In the water purification filter assembly, in a case where the water purification tank or the filter main body is coupled to the first casing or the second casing, respectively, at a predetermined angle with respect to the ground,
the holding portion may be formed in a direction that faces the direction of the center of gravity due to a load.

The water purification filter assembly may further include a fluid dispensing unit formed on an inner surface of the water purification tank and guiding the feed water.

In the water purification filter assembly, the dispensing unit may include:
a distribution portion formed to prevent the purified feed water from being introduced into the water purification tank; and
a plurality of partition portions formed to be spaced a predetermined distance apart and connected from a bottom surface of one side of the water purification tank to the distribution portion.

In the water purification filter assembly, the purified feed water introduced into the water purification tank may collide with the distribution portion and may be introduced between each of the partition portions.

In the water purification filter assembly, the water purification tank may include:
a purification-water introduction port through which the purified feed water discharged through an outlet port in the filter main body is introduced into the water purification tank; and
a purification-water discharging port through which the purified feed water is discharged to the outside.

In the water purification filter assembly, the water purification filter assembly may be formed on a portion of the water purification tank that is connected to the purification-water introduction port.

In the water purification filter assembly, a bubble may be collected in a space between the uppermost surface of the purified feed water introduced into the water purification tank and the purification-water discharging port and may be removed from the space.

The water purification filter assembly may further include a drain unit formed on one side of the filter main body in a manner that is attachable and detachable through one side of the second casing, moisture dropping from the filter main body being collected in the drain unit,
wherein the drain unit may be formed in such a manner that one end portion thereof has such a predetermined length that the moisture dropping from the filter main body is collected in the drain unit.

In the water purification filter assembly, the drain unit may include:
an inclination surface obliquely formed at a predetermined angle in one direction in such a manner that the moisture drops from the water purification tank or the filter main body and flows; and
a drawing portion extending from one side of the inclination surface and pushable in or pullable out in a state of being gripped by a user.

In the water purification filter assembly, at least one part of the drawing portion of the drain unit may be exposed from out of the second casing in such a manner that the user is able to grip the drawing portion.

In the water purification filter assembly, the drain unit may be formed in a manner that is attachable and detachable through a front surface of the first casing,
and may be arranged under the filter main body or the water purification tank.

In the water purification filter assembly, the drain unit with a predetermined length may extend over a length of an end portion of a head unit that is connected to one side of the filter main body.

In the water purification filter assembly, a drawing hole through which the drain unit is inserted or pulled out may be formed in the second casing.

In the water purification filter assembly, a protective cover in which at least one portion of the filter main body or the water purification tank is accommodated may be formed on one side of the second casing.

In the water purification filter assembly, at least one portion of the filter main body may be rotatably coupled to the protective cover or may be removed therefrom in a state of being exposed.

According to another aspect of the present disclosure, there is provided a refrigerator or a water purifier including the water purification filter assembly.

Advantageous Effects of Invention

A water purification filter assembly according to the present disclosure employs an improved structure in which a water purification tank and a filter are included and is capable of being mounted within a limited space in a water purifier or a refrigerator. Accordingly, the effect of efficiently utilizing a limited space in a refrigerator including the water purification filter assembly can be achieved.

In addition, a water purification filter assembly according to the present disclosure is specifically structured to arrange a water purification tank and a filter. Accordingly, the effect of stably supporting the water purification tank or the filter in the water purification filter assembly and a refrigerator including the water purification filter assembly can be achieved.

In addition, a water purification filter assembly according to the present disclosure sequentially inflows and discharges feed water into and from a water purification tank. Accordingly, the effect of inflowing and discharging the feed water in a circulating manner in the water purification tank and a refrigerator including the water purification filter assembly can be achieved.

In addition, according to the present disclosure, the effect of easily discharging water remaining in a filter when the filter is discharged while water is supplied and discharged within a water purifier or a refrigerator can be achieved.

The present disclosure is not limited to the above-mentioned effects. From the following claims, an effect not mentioned above would be clearly understandable by a person of ordinary skill in the art.

BRIEF DESCRIPTION OF DRAWINGS

FIG. 1 is a view illustrating a refrigerator in which a water purification filter assembly according to an embodiment of the present disclosure is installed.

FIG. 2 is a perspective view illustrating an exterior appearance of a filter main body according to the embodiment of the present disclosure.

FIGS. 3 and 4 are views each illustrating the inside of the water purification filter assembly according to the embodiment of the present disclosure.

FIGS. 5 to 7 are views each illustrating a state where a water purification tank according to the embodiment of the present disclosure is mounted in a water purification filter housing.

FIG. 8 is a view illustrating a state where a water purification tank according to the embodiment of the present disclosure is mounted in a first casing.

FIGS. 9 to 11 are enlarged views illustrating one portion of a support according to the embodiment of the present disclosure.

FIGS. 12 and 13 are enlarged views each illustrating a state where one portion of the water purification tank according to the embodiment of the present disclosure is coupled to the support.

FIG. 14 is a cross-sectional view schematically illustrating the water purification tank according to the present disclosure.

FIG. 15 is an enlarged view illustrating one portion of the water purification tank in FIG. 14.

FIG. 16 is a schematic perspective view illustrating a fluid dispensing unit according to the embodiment of the present disclosure.

FIG. 17 is a view illustrating a state where purified feed water is introduced into the water purification tank.

FIG. 18 are views each illustrating the inside of a water purification filter assembly in which a protective cover and a drain unit according to the present disclosure are formed.

FIG. 19 is an enlarged view illustrating one portion of the inside of the water purification filter assembly in FIG. 18.

FIG. 20 is a cross-sectional view illustrating one portion of the water purification filter assembly, the process of water draining through the drain unit according to the embodiment of the present disclosure being able to be understood from the cross-sectional view.

FIG. 21 is a schematic perspective view illustrating the drain unit according to the embodiment of the present disclosure.

FIG. 22 is a perspective view illustrating the filter main body according to the embodiment of present disclosure.

FIG. 23 is views each illustrating a state where the drain unit according to the embodiment of the present disclosure is used.

FIG. 24 is a cross-sectional view illustrating one portion of the filter main body according to the embodiment of the present disclosure.

DESCRIPTION OF EMBODIMENTS

An embodiment of the present disclosure will be described in detail below with reference to the accompanying drawings. It should be noted that the same constituent elements, although illustrated in different drawings, are given the same reference numeral if possible. In addition, specific descriptions of a well-known configuration and function associated with the embodiment of the present disclosure will be omitted when determined as making the embodiment of the present disclosure difficult to understand.

The ordinal numbers, first, second, and so forth, the letters in upper case A, B, and so forth, and the parenthesized letters in lower case, (a), (b), and so forth may be used to name constituent elements according to the embodiment of present disclosure. These ordinal numbers and letters are used only to distinguish among the same constituent elements, and do not impose any limitation on the natures of the same constituent elements or the order thereof. Unless otherwise defined, all terms including technical or scientific terms, which are used in the present specification, have the same meanings as are normally understood by a person of ordinary skill in the art to which the present disclosure pertains. The term as defined in a dictionary in general use should be construed as having the same meaning as interpreted in context in the relevant technology, and, unless otherwise explicitly defined in the present specification, is not construed as having a prototypical meaning or an excessively literal meaning.

FIG. 1 is a view illustrating a refrigerator in which a water purification filter assembly 10 according to an embodiment of the present disclosure is installed.

With reference to FIG. 1, the refrigerator in which the water purification filter assembly 10 according to the embodiment of the present disclosure is installed may include a main body 7 in which a main refrigerator compartment and a freezer compartment are installed and a door 8A, 8B, and 9 that is used to open and close the front of the main body 7.

The main body 7 may be formed in the shape of a rectangle that is open at the front surface. The open surface of the main body 7 may be formed by the combined open surfaces of the main refrigerator compartment and the freezer compartment.

The door 8A, 8B, and 9 may include a main refrigerator compartment door 8A and 8B that is used to open and close the front of the main refrigerator compartment, and a freezer compartment door 9 that is used to open and close the front of the freezer compartment. The main refrigerator compartment door 8A and 8B may be arranged at a higher position than the freezer compartment door 9. However, in a case where the main refrigerator compartment is arranged at a lower position than the freezer compartment, the main refrigerator compartment door 8A and 8B may be arranged at a lower position than the freezer compartment door 9.

The main refrigerator compartment door 8A and 8B may be provided as two doors. The main refrigerator compartment door 8A and 8B may include a first main refrigerator compartment door 8A that is used to open one portion of the front of the main refrigerator compartment, and a second main refrigerator compartment door 8B that is used to open and close the other portion of the front of the main refrigerator compartment. The first main refrigerator compartment door 8A may be used to open and close the left-side portion of the front of the main refrigerator compartment by rotating about the left end thereof. The second main refrigerator compartment door 8B may be used to open and close the right-side portion of the front of the main refrigerator compartment by rotating about the right end thereof. When the refrigerator is viewed from the front, the first main refrigerator compartment door 8A may be arranged to the right side of the second main refrigerator compartment door 8B, and the second main refrigerator compartment door 8B may be arranged to the right side of the first main refrigerator compartment door 8A.

The freezer compartment door 9 may be provided as a single door. The freezer compartment door 9 may be open and closed by being slid in the forward-backward direction.

The water purification filter assembly 10 may be installed in an upper left section of the main refrigerator compartment. However, the water purification filter assembly 10 may be installed in an upper left section of the main refrigerator compartment, may be installed in an upper right section of the freezer compartment, and may be installed in an upper left section of the freezer compartment.

Of course, the refrigerator may be configured as a refrigerator that includes only the freezer compartment without the main refrigerator compartment and may be configured as a refrigerator that includes only the main refrigerator compartment without the freezer compartment.

In addition, the main refrigerator compartment door 8A and 8B may be provided as a single door without being separated into two doors, and the freezer compartment door 9 may be provided as two doors instead of being integrated into a single door.

The refrigerator according to the embodiment of the present disclosure is described above, taking as an example a French door refrigerator (FDR). That is, the main refrigerator compartment is provided on the upper portion of the refrigerator according to the embodiment of the present disclosure, and the freezer compartment is provided on the lower portion thereof. The two doors 8A and 8B that are used to open and close the front of the main refrigerator compartment by rotating about the left and right ends, respectively, thereof are provided on the main refrigerator compartment. The door 9 that is used to open and close the front of the freezer compartment by being slid in the forward-backward direction, that is, in a manner that is pulled out and pushed in, is provided on the freezer compartment. However, the refrigerator according to the embodiment of the present disclosure is not limited to the FDR. The present disclosure may find application in the field of side-by-side (SBS) door-type refrigerators in which two doors are used to open and close the front of the freezer compartment by rotating about both ends, respectively, thereof.

When one of the main refrigerator compartment and the freezer compartment is defined as a first compartment, and the other one thereof is defined as a second compartment, the water purification filter assembly 10 may be installed in an upper lateral section of the first compartment or the second compartment.

FIG. 2 is a perspective view illustrating an exterior appearance of the water purification filter assembly 10 according to the embodiment of the present disclosure. FIGS. 3 and 4 are views each illustrating the inside of the water purification filter assembly 10 according to the embodiment of the present disclosure. FIGS. 5 and 6 are views each illustrating a state where a water purification tank 300 according to the embodiment of the present disclosure is mounted in a water purification filter housing.

With reference to FIGS. 2 to 6, the water purification filter assembly 10 according to the embodiment of the present disclosure may be configured to include a filter main body 500 in which feed water introduced from the outside is purified, the water purification tank 300 which is connected to one side of the filter main body 500 and in which the purified feed water is stored, a second casing 12 in which the filter main body 500 is accommodated, and a first casing 11 in which the water purification tank 300 is accommodated.

The first casing 11 in which the water purification tank 300 is accommodated may be arranged perpendicularly to the second casing 12 in which the filter main body 500 is accommodated. In some cases, the first casing 11 and the second casing 12 may be formed to employ a structure that is coupled in a manner that is adjustable to a preset angle. The reason for this is that the first casing 11 and the second casing 12 employ a connection structure that is bent at various angles, allowing them to fit into an external structure when arranged in the refrigerator or the freezer compartment. As a result, a restricted space inside the refrigerator and the freezer compartment may be used more efficiently. This structure may provide a solution to overcome a structural limitation in which a filter and a water tank are accommodated in one space in the related art.

The filter main body 500 may be arranged in the second casing 12. The filter main body 500 serves as a space in which the feed water supplied from the outside is purified. A specific structure of the filter main body 500 is described in detail below with reference to the accompanying drawing. The second casing 12 in the shape of a rectangle has a predetermined space inside, wherein the filter main body 500 may be arranged. The filter main body 500 may be connected to the water purification tank 300 in a state of being arranged in the second casing 12. That is, the purified feed water may be introduced from the filter main body 500 into the water purification tank 300 and may be stored therein.

An inlet port 210 (in FIG. 24) through which the feed water is introduced from the outside and an outlet port 220 (in FIG. 24) through which the feed water is discharged may be formed in the filter main body 500. A third connection pipe $H_3$ may be connected to the inlet port 210 (in FIG. 24) in the filter main body 500, and a first connection pipe $H_1$ may be connected to the outlet port 220 (in FIG. 24) with an auxiliary pipe $H_0$ in between. An AC valve 13 may be formed on a connection portion of the first connection pipe $H_1$ that is connected to the outlet port 220 (in FIG. 24) in the filter main body 500, with the auxiliary pipe $H_0$ in between. The filter main body 500 may be fixed to the second casing 12 by being coupled thereto with a fastening member 12-1.

A purification-water introduction port 310 through which the feed water purified by the filter main body 500 is introduced and a purification-water discharging port 320 through which the purified feed water is discharged may be formed in the water purification tank 300. The purification-water introduction port 310 in the water purification tank 300 may be connected to a fourth connection pipe $H_4$ in such a manner that the feed water purified by the filter main body 500 is introduced into the water purification tank 300 through the AC valve 13.

Specifically, the water purification filter assembly according to the present disclosure may include the second casing 12 in which the filter main body 500 in which the feed water introduced from the outside is purified is accommodated, and the first casing 11 in which the water purification tank 300 in which the purified feed water supplied from the filter main body 500 is stored is accommodated. The filter main body 500 may be fixed to a lower portion of an inner surface of the second casing 12 by being fastened thereto with a plurality of fastening members 12-1 in a screw-fastening manner. According to the present disclosure, the first casing 11 and the second casing 12 may be arranged to be perpendicularly connected to each other. Likewise, the filter main body 500 and the water purification tank 300 may also be perpendicularly arranged.

The above-described inlet port 210 (in FIG. 24) may be formed in the filter main body 500, and the feed water may be supplied from the outside through the third connection pipe $H_3$ connected to the inlet port 210 (in FIG. 24). The feed water is introduced through the inlet port 210 (in FIG. 24) in the filter main body 500 and is purified. Then, the purified feed water may flow to the first connection pipe $H_1$ that is connected to the outlet port 220 (in FIG. 24) through the auxiliary pipe $H_0$. In this case, the AC valve 13 may be formed on the first connection pipe $H_1$. Through the AC valve 13, the purified feed water may be directly supplied to an external device, for example, an ice maker (not illustrated), that is connected to one end portion of the first connection pipe $H_1$.

The fourth connection pipe $H_4$ here is a pipe that branches off from the AC valve 13 formed on the first connection pipe $H_1$ and is connected to the water purification tank 300. The fourth connection pipe $H_4$ may extend from the AC valve 130 and may be connected to the water purification tank 300 through the purification-water introduction port 310 in the water purification tank 300. The AC valve 13 may be open and closed automatically or manually according to a signal and may perform a function of adjusting an amount of flowing water or the like.

The feed water that is introduced through the purification-water introduction port 310 in the water purification tank 300 and is purified in the filter main body 500 is supplied to a dispenser or the like, which is exposed to outside the refrigerator, through the purification-water discharging port 320 in the water purification tank 300. The purified feed water can be consumed as drinking water by a user through the dispenser.

The water purification filter assembly 10 according to the present disclosure employs not only a structure in which the second casing 12 in which the filter main body 500 is accommodated and the first casing 11 in which the water purification tank 300 is accommodated are vertically connected to each other, but also a structure in which the water purification tank 300 is obliquely arranged in the first casing 11. The present disclosure features these structures that can greatly improve spatial efficiency. That is, the water purification tank 300 may be arranged in a manner that is inclined at a predetermined angle with respect to a surface of on the first casing 11 that is parallel to the ground. With this structure in which the water purification tank 300 is obliquely arranged, a constituent element may be additionally arranged within a sparely secured installation space. The present disclosure features these arrangements that can greatly improve the spatial efficiency.

FIG. 7 is a view illustrating a state where the water purification tank 300 according to the embodiment of the present disclosure is mounted in the water purification filter housing.

With reference to FIG. 7, as described above, the water purification filter assembly 10 according to the present disclosure not only employs a structure in which the second casing 12 in which the filter main body 500 is accommodated and the first casing 11 in which the water purification tank 300 is accommodated are vertically connected to each other, but also a structure in which the water purification tank 300 is arranged in the first casing 11 in such a manner that one side thereof is inclined at an inclination angle with respect to the other side thereof. With this structure in which the water purification tank 300 is obliquely arranged, as illustrated in FIG. 7, separate installation spaces may be secured over the upper left portion of the water purification tank 300 and under the lower right portion thereof, respectively. The present disclosure features these installation spaces in which other pipes, as well as values including the AC valve 14, can be additionally installed.

An end portion of one side of the water purification tank 300 may have a rounded shape. The water purification tank 300 may be arranged in the first casing 11 in such a manner that the one side thereof is inclined upward or downward. The effect of this arrangement is that various valves and pipes, and the like may be accommodated in the installation spaces that are formed by these portions of the water purification tank 300 that is obliquely arranged.

FIG. 8 is a view illustrating a state where the water purification tank 300 according to the embodiment of the present disclosure is mounted in the first casing 11. FIGS. 9 to 11 are enlarged views illustrating one portion of a support 700 according to the embodiment of the present disclosure. FIGS. 12 and 13 are enlarged views each illustrating a state where one portion of the water purification tank 300 according to the embodiment of the present disclosure is coupled to the support 700.

With reference to FIGS. 8 to 13, the water purification filter assembly 10 according to the present disclosure may be configured to include the filter main body 500 in the feed water introduced from the outside is purified, the water purification tank 300 which is connected to one side of the filter main body 500 and in which the purified feed water is stored, the second casing 12 in which the filter main body 500 is accommodated, and the first casing 11 in which the water purification tank 300 is accommodated. In this case, as described above, the water purification tank 300 according to the present disclosure may be arranged to be inclined at a predetermined angle with respect to a surface of the first casing 11 that is parallel to the ground.

The water purification tank 300 is formed in the first casing 11 in such a manner that one side thereof is inclined upward in the lengthwise direction thereof. As a result, the center of gravity of the water purification tank 300 itself, at which the entire weight thereof is concentrated, may be positioned in a predetermined portion thereof in an unequally distributed manner. In the water purification filter assembly according to the present disclosure, at least one support that can support the center of gravity may be formed on an upper end portion and a lower end portion of the water purification tank 300, thereby effectively supporting the center of gravity of the water purification tank 300 that is positioned in an unequally distributed manner.

Specifically, the water purification tank 300 of the water purification filter assembly 10 according to the embodiment of the present disclosure may be fixed to the support 700 formed on the first casing 11, by being coupled thereto. The support 700 may be formed on edge portions, positioned over and under the water purification tank 300 obliquely arranged, of an inner surface of the first casing 11. The support 700 may be integrally formed with the first casing 11 by injection molding. A fastening hole 311 into which a bolt 30 is inserted may be formed in the water purification tank 300, and a fastening hole 722 may also be formed in a portion, facing the fastening hole 311, of the support 700.

First, a fastening protrusion 330 may be formed on each of the upper and lower ends of the water purification tank 300 in a manner that protrusively extends in one direction therefrom. For fastening to the support 700, the fastening hole 311 into which the bolt 30 is inserted may be formed in a center portion of the fastening protrusion 330 on the water purification tank 300.

The support 700 may be configured to include an extensional contact body 710, having inclination surface 711, that supports one side of the water purification tank 300 or the filter main body 500, and a holding portion 720 that is formed in a manner that extends from the extensional contact body 710 in a shape that supports the fastening protrusion 330 for the water purification tank 300 or the filter main body 500. Likewise, the fastening hole 722 may be formed in a center portion of the holding portion 720. The bolt 30 that is screw-fastened to the fastening hole 311 in the water purification tank 300 by passing therethrough is inserted into the fastening hole 722. In this case, the inclination surface 711 of the extensional contact body 710 that supports one side of the filter main body 500 may have a shape that varies according to a shape of a contact portion of the filter main body 500.

In addition, a stopper 721 may be formed on the holding portion 720 in a shape that protrusively extends upward therefrom over a predetermined distance. The stopper 721 may be formed on the holding portion 720 in an upward protrusive manner in a shape that, for support, surrounds one portion of the fastening protrusion 330 on the water purification tank 300.

In this case, the water purification tank 300 according to the present disclosure is obliquely arranged in the first casing 11, and the stopper 721 may be formed on the holding portion 720 in a shape that, for support, surrounds the fastening protrusion 330, but varies with the position and shape of the fastening protrusion 330 formed on an upper or lower end portion of the water purification tank 300. As one example, a structure in which one side of the water purification tank 300 faces downward and the other side thereof faces upward is employed may be employed. In this case, as illustrated in FIG. 6, of the stoppers 721 on the holding portion 720 according to the present disclosure, the stopper 721 formed over the water purification tank 300 may have a shape that surrounds an upper surface of the fastening protrusion 330 formed on the upper end portion of the water purification tank 300 obliquely arranged. In contrast, as illustrated in FIG. 7, the stopper 721 may be formed under the water purification tank 300 in a shape that supports a lower surface of the fastening protrusion 330 formed on a lower end portion of the water purification tank 300 obliquely arranged. As a result, the water purification tank 300 may be stably supported on the support 700 formed on the first casing 11 without being shaken.

That is, according to the present disclosure, the stopper 721 may be formed in a varying shape on the holding portion 720 of the support 700 formed on each of the upper and lower portion of the water purification tank 300, in a manner as to stably support the center of gravity of the water purification tank 300 that changes in an unequally distributed manner due to the inclination of the water purification tank 300.

Furthermore, with this efficient structure in which the water purification tank 300 is obliquely arranged, a fluid dispensing unit 800 that controls flowing of a fluid may be formed on the water purification tank 300 according to the present disclosure. The fluid dispensing unit 800 that is coupled to the water purification tank 300 that is obliquely arranged will be described in detail below with reference to the accompanying drawings.

FIG. 14 is a cross-sectional view schematically illustrating the water purification tank 300 according to the present disclosure. FIG. 15 is an enlarged view illustrating one portion of the water purification tank 300 in FIG. 14. FIG. 16 is a schematic perspective view illustrating the fluid dispensing unit 800 according to the embodiment of the present disclosure. FIG. 17 is a view illustrating a state where the purified feed water is introduced into the water purification tank 300.

With reference to FIGS. 8 to 13, the water purification filter assembly 10 according to the present disclosure may be configured to include the filter main body 500 in the feed water introduced from the outside is purified, the water purification tank 300 which is connected to one side of the filter main body 500 and in which the purified feed water is stored, the second casing 12 in which the filter main body 500 is accommodated, and the first casing 11 in which the water purification tank 300 is accommodated. In this case, as described above, the water purification tank 300 according to the present disclosure may be arranged to be inclined at a predetermined angle with respect to the surface of the first casing 11 that is parallel to the ground.

The water purification tank 300 is formed in the first casing 11 in such a manner that one side thereof is inclined upward in the lengthwise direction thereof. As a result, the purified feed water that is introduced through the purification-water introduction port 310 in the water purification tank 300 may flow toward the purification-water discharging port 320 in the water purification tank 300. However, in this case, the purified feed water introduced through the purification-water introduction port 310 in the water purification tank 300 may not flow toward the purification-water discharging port 320 in the order in which the purified feed water is introduced. That is, the purified feed water may not flow on a sequential flow basis. As a result, according to the present disclosure, the fluid dispensing unit 800 may be installed in such a manner that the purified feed water introduced through the purification-water introduction port 310 in the water purification tank 300 flows in a vortical manner in an entrance-port side of the fluid dispensing unit 800 while being distributed.

The fluid dispensing unit 800 according to the present disclosure may include a distribution portion 810 that is formed to prevent the purified feed water from being introduced into the water purification tank 300, and partition portions 820, formed to be spaced a predetermined distance apart, that are connected from a bottom surface of one side of the water purification tank 300 to the distribution portion 810.

The fluid dispensing unit 800 may be formed in a shape that extends from the purification-water introduction port 310 in the water purification tank 300 in a manner that communicates therewith. As a result, the fluid dispensing unit 800 may control the direction in which the purified feed water is introduced, by directly guiding the purified feed water introduced through the purification-water introduction port 310 in the water purification tank 300. The purified feed water introduced through the purification-water introduction port 310 first directly collides with the distribution portion 810 of the fluid dispensing unit 800, thereby being temporarily prevented from flowing forward and forming a vortical flow. At this point, the purified feed water collides with the distribution portion 810 and is distributed between each of the partition portions 820 formed to extend from one side of the water purification tank 300, thereby flowing in a multiplicity of directions.

That is, the purified feed water introduced from the purification-water introduction port 310 in the water purification tank 300 sequentially pushes up the previously introduced feed water toward the purification-water discharging port 320 in the water purification tank 300, and thus the previously introduced feed water is sequentially discharged in a circulative manner. As a result, a phenomenon where the subsequently introduced feed water can be discharged earlier than the previously introduced feed water can be suppressed.

Moreover, as illustrated in FIG. 17, the water purification tank 300 is formed in the first casing 11 in such a manner that the purification-water discharging port 320 is inclined, upward in the lengthwise direction of the water purification tank 300, with respect to one side of the water purification tank 300, that is, with respect to the purification-water introduction port 310. As a result, a bubble may be collected between the uppermost surface of the purified feed water introduced into the water purification tank 300 and the purification-water discharging port 320 and may be discharged. Consequently, since the water purification tank 300 is obliquely arranged, when the feed water is introduced, a space in which air is collected may be removed from inside the water purification tank 300.

FIG. 18 are views each illustrating the inside of the water purification filter assembly in which a protective cover 12-3 and a drain unit 900 according to the present disclosure are formed. FIG. 19 is an enlarged view illustrating one portion of the inside of the water purification filter assembly in FIG. 18. FIG. 20 is a cross-sectional view illustrating one portion of the water purification filter assembly, the process of water draining through the drain unit 900 according to the embodiment of the present disclosure being able to be understood from the cross-sectional view. FIG. 21 is a schematic perspective view illustrating the drain unit 900 according to the embodiment of the present disclosure.

With reference to FIGS. 18 to 21, the water purification filter assembly 10 according to the present disclosure may be configured to include the filter main body 500 in which the feed water introduced from the outside is purified, the water purification tank 300 which is connected to one side of the filter main body 500 and in which the purified feed water is stored, the second casing 12 in which the filter main body 500 is accommodated, and the first casing 11 in which the water purification tank 300 is accommodated. In this case, the drain unit 900 in which the water dropping from the filter main body 500 is collected may be formed in the second casing 12. The drain unit 900 may be mounted in the second casing 12 in a manner that is removable therefrom.

The filter main body 500 may be accommodated in the second casing 12. The second casing 12 may include a cover that is formed approximately in the shape of a rectangle and is detachably attached thereto to open or close one side thereof. In this case, the protective cover 12-3 into which one portion of the filter main body 500 may be inserted may be coupled to end portions of the second casing 12 and the cover 15. The protective cover 12-3 may be formed in a shape that extends in one direction from the end portions of the second casing 12 and the cover 15, in such a manner as to easily pull out the filter main body 500 for replacement. In some cases, the protective cover 12-3 may be formed in an attachable and detachable manner. That is, the protective cover 12-3 is not limited to a specific structure, as long as it is structurally detachably attachable through the end portions of the second casing 12 and the cover 15. For example, the protective cover 12-3 may employ a press-hook fastening technique or a screw fastening technique that uses a bolt or the like.

Because the protective cover 12-3 is formed in a shape that extends from the end portions, in one direction, of the coupled second casing 12 and cover 15, an end portion, in one direction, of the filter main body 500 may be easily inserted into the protective cover 12-3. That is, the one end portion, in one direction, of the filter main body 500 may be inserted into the protective cover 12-3 in a state of being exposed from out of the second casing 12 and the cover 15. Therefore, the user can remove the protective cover 12-3 from the second casing 12 and the cover 15 and then can easily pull out the filter main body 500 for replacement and repair. A method of pulling out the filter main body 500 from the protective cover 12-3 in this manner will be described in more detail below with respect to the accompanying drawing.

A drawing hole 12-2 through which the drain unit 900 is pushed in from the outside and pulled out to the outside may be formed in the second casing 12 and the cover 15 that are fastened to each other. Because the drain unit 900 is arranged under the filter main body 500 arranged in the second casing 12 and the cover 15, moisture or the like dropping from the filter main body 500 may be guided into the drain unit 900 for collection.

The drain unit 900 may be configured to include an inclination surface 920 and a drawing portion 910. The inclination surface 920 is obliquely formed at a predetermined angle in the lengthwise direction thereof in such a manner that moisture, water, or the like dropping from the filter main body 500 possibly flows in one direction. The drawing portion 910 extends from one side of the inclination surface 920 and is pushable in into the second casing 12 or pullable out from the second casing 12 in a state of being gripped by the user. In this case, the drain unit 900 is not limited to a specific structure, as long as it employs a structure in which the moisture or the like that drop is possibly guided in one direction. The drain unit 900 may be structured formed in such a manner that, as described above, the inclination surface 920 has a height decreasing in one direction, or may be structurally formed without a separate inclination surface with a different height in a manner that is obliquely inserted into the second casing 12 while being mounted therein. It is desired that the drain unit 900 is an injection-molded component formed of a transparent or translucent plastic material to ensure visibility and usability, but is not limited thereto.

Because the drain unit 900 is formed of a transparent or translucent material, from the outside, it can be checked whether or not the water or the like leaks from the transparent or translucent plastic drain unit 900. Furthermore, through a transparent or translucent front portion of the drain unit 900, it can be directly checked whether or not an inside filter operates properly. According to the result of the checking, the filter main body 500 can be replaced or repaired. For example, it is possible to check the internal state of the water purification filter assembly 10 from the outside through the drain unit 900. This prior checking can prevent the phenomenon where the inside filter is frozen to burst due to a system error, such as internal supercooling.

The drain unit 900 here may be arranged under the filter main body 500 in such a manner that a length W1 of the drain unit 900 is the same as lengths of coupled portions of the filter main body 500 and a head unit 200 in order that the water remaining in the filter main body 500 all drops in the drain unit 900 and is collected therein when the filter main body 500 is detached for replacement. The reason for this is that moisture or the like may also occur in a portion of the filter main body 500, into which the feed water flowing through the inlet port 210 and the outlet port 220 in the head unit 200 is introduced. Thus, it is desired that the drain unit 900 extends over a length of such a portion. Of course, the drain unit 900 with the length W1 may be formed in a shape that extends over a length W2 of one end portion of the head unit 200 (refer to a red-colored dotted line). As a result, while the filter main body 500 and the head unit 200 are detached from each other, any fluid that flows backward and leaks between the drain unit 900 with the length W1 and one end portion, with the length W2, of the head unit 200 may also be easily collected.

FIG. 22 is a perspective view illustrating the filter main body 500 according to the embodiment of present disclosure. FIG. 23 is views each illustrating a state where the drain unit 900 according to the embodiment of the present disclosure is used.

A method of pulling out the filter main body 500 and the drain unit 900 is described with reference to FIGS. 22 and 23. As described above, the filter main body 500 and the drain unit 900 according to the present disclosure may be structurally detachably coupled to the second casing 12. In the case, the filter main body 500 may be configured to include a filter main-body casing 510, an upper casing 520 that is rotatably coupled to the head unit 200, and a lower casing 530 on which a handle 531 to be gripped by the user is formed.

In a case where the above-described structure is employed, in a state where the filter main body 500 is mounted in the second casing 12, the user can easily detach the filter main body 500 from the second casing 12 by rotating the handle 531 formed on the lower casing 530 exposed from out of the protective cover 12-3. Furthermore, because a gripping groove (not illustrated) is formed in the drawing portion 910 of the drain unit 900, in some cases, the user can pull out the drawing portion 910 of the drain unit 900 while gripping the gripping groove formed by recessing the drawing portion 910. Then, the user can remove water and the like that are collected in the drain unit 900.

FIG. 24 is a cross-sectional view illustrating one portion of the filter main body 500 according to the embodiment of the present disclosure.

With reference to FIG. 24, the head unit 200 is provided on the top of a filter casing 100. The head unit 200 may be formed on the top of the filter casing 100 in a manner that protrudes upward therefrom.

The inlet port 210 and the outlet port 220 may be formed in the head unit 200. The inlet port 210 and the outlet port 220 may be formed in a circumferential surface of the head unit 200 in a manner that protrudes in the radial direction therefrom. The inlet port 210 and the outlet port 220 may be formed in such a manner as to protrude in opposite directions. The inlet port 210 may be formed in one side of the circumferential surface of the head unit 200 in a manner that protrudes in the radial direction therefrom, and the outlet port 220 may be formed in the other side of the circumferential surface of the head unit 200 in a manner that protrudes in the radial direction therefrom.

The inlet port 210 and the outlet port 220 may be formed in the shape of a pipe. The feed water may be introduced through the inlet port 210. The feed water purified in the filter main body 500 may be discharged through the outlet port 220. The feed water introduced into the filter casing 100 through the inlet port 210 may be purified in the filter casing 100 and then may be discharged from out of the filter main body 500 through the outlet port 220.

It would be understood by a person of ordinary skill in the art that the present disclosure pertains to that the present disclosure can be practiced in the form of other specific forms without changing the technical idea and essential features thereof. Therefore, in every aspect, the embodiment described above should be understood as being exemplary and non-restrictive. It should be interpreted that the scope of the present disclosure should be defined by the following claims instead of by the above-detailed description and that all alterations and modifications that are derived from the constructions and scopes of the following claims and from equivalents thereof fall within the scope of the present disclosure.

What is claimed is:

1. A water purification filter assembly comprising:
    a filter main body configured to be connected to an inlet port through which feed water is supplied and an outlet port through which purified feed water is discharged;
    a water purification tank arranged on one side of the filter main body and configured to store the purified feed water from the filter main body;
    a first casing configured to accommodate the water purification tank;
    a second casing configured to accommodate the filter main body; and
    a drain unit provided on one side of the filter main body to be attachable and detachable through one side of the second casing, and configured to collect moisture dropping from the filter main body,
    wherein the filter main body is coupled to a first end of a head unit which includes the inlet and outlet ports, and the drain unit extends over a second end of the head unit which is opposite to the first end thereof, and
    wherein the second casing includes a drawing hole dedicated to insertion of the drain unit into the second casing and withdrawal of the drain unit from the second casing.

2. The water purification filter assembly of claim 1, wherein the first casing in which the water purification tank is accommodated is arranged adjacent to a rear surface of the second casing in which the filter main body is accommodated, the rear surface thereof being opposite to a front surface thereof.

3. The water purification filter assembly of claim 1, employing a structure in which the second casing is perpendicularly coupled to one side of the first casing.

4. The water purification filter assembly of claim 1, wherein the water purification tank that is accommodated in the first casing is arranged in such a manner that at least one side thereof is inclined at a predetermined angle with respect to the ground.

5. The water purification filter assembly of claim 1, wherein a valve is arranged on an inclined portion of the water purification tank in the first casing.

6. The water purification filter assembly of claim 1, wherein a valve is arranged in at least one of the first casing and the second casing.

7. The water purification filter assembly of claim 6, wherein the valve is formed on a connection portion of the filter main body and the water purification tank through which the purified feed water in the filter main body is discharged into the water purification tank.

8. The water purification filter assembly of claim 6, wherein the valve is configured to directly supply the purified feed water in the filter main body to an ice maker for ice separation.

9. The water purification filter assembly of claim 1, further comprising:
at least one support supporting at least one side of the filter main body or the water purification tank,
wherein the support comprises:
an extensional contact body supporting at least one portion of the water purification tank or the filter main body; and
a holding portion formed in a manner that extends from the extensional contact body in a shape that supports at least one portion of a fastening protrusion for the water purification tank or the filter main body.

10. The water purification filter assembly of claim 9, wherein the holding portion is formed in a shape that supports at least one portion of the fastening protrusion.

11. The water purification filter assembly of claim 9, wherein the holding portion is formed in such a manner that at least one portion thereof has a curved or bent cross section.

12. The water purification filter assembly of claim 1, further comprising:
a fluid dispensing unit formed on an inner surface of the water purification tank and guiding the purified feed water.

13. The water purification filter assembly of claim 12, wherein the fluid dispensing unit comprises:
a distribution portion formed to prevent the purified feed water from being introduced into the water purification tank; and
a plurality of partition portions formed to be spaced a predetermined distance apart and connected from a bottom surface of one side of the water purification tank to the distribution portion.

14. The water purification filter assembly of claim 13, wherein the purified feed water introduced into the water purification tank collides with the distribution portion and is introduced between each of the partition portions.

15. The water purification filter assembly of claim 12, wherein the water purification tank comprises:

a purification-water introduction port through which the purified feed water discharged through an outlet port in the filter main body is introduced into the water purification tank; and
a purification-water discharging port through which the purified feed water is discharged to the outside.

16. The water purification filter assembly of claim 15, wherein the fluid dispensing unit is formed on a portion of the water purification tank that is connected to the purification-water introduction port.

17. The water purification filter assembly of claim 1, wherein the drain unit comprises:
an inclination surface obliquely formed at a predetermined angle to cause the moisture dropping from the filter main body to flow; and
a drawing portion extending from one side of the inclination surface and pushable in or pullable out in a state of being gripped by a user.

18. The water purification filter assembly of claim 17, wherein at least one part of the drawing portion of the drain unit is exposed from out of the second casing in such a manner that the user is able to grip the drawing portion.

19. The water purification filter assembly of claim 1, wherein the drain unit is formed in a manner that is attachable and detachable through a front surface of the second casing and is arranged under the filter main body.

20. The water purification filter assembly of claim 1, wherein a protective cover in which at least portion of the filter main body is accommodated is formed on one side of the second casing.

21. The water purification filter assembly of claim 20, wherein at least one portion of the filter main body is rotatably coupled to the protective cover or removed therefrom in a state of being exposed.

22. The water purification filter assembly of claim 1, wherein the drain unit extends to cover entire bottom portions of the filter main body and the head unit.

23. The water purification filter assembly of claim 1, wherein only the drain unit is inserted into and withdrawn from the second casing via the drawing hole.

* * * * *